US008620848B1

(12) United States Patent
Komissarchik et al.

(10) Patent No.: US 8,620,848 B1
(45) Date of Patent: Dec. 31, 2013

(54) SYSTEM AND METHOD FOR FACTS EXTRACTION AND DOMAIN KNOWLEDGE REPOSITORY CREATION FROM UNSTRUCTURED AND SEMI-STRUCTURED DOCUMENTS

(71) Applicant: Glenbrook Networks, Hillsborough, CA (US)

(72) Inventors: Julia Komissarchik, Hillsborough, CA (US); Edward Komissarchik, Hillsborough, CA (US)

(73) Assignee: Glenbrook Networks, San Mateo, CA (US)

( * ) Notice: Subject to any disclaimer, the term of this patent is extended or adjusted under 35 U.S.C. 154(b) by 0 days.

(21) Appl. No.: 13/802,369

(22) Filed: Mar. 13, 2013

Related U.S. Application Data

(60) Division of application No. 13/546,960, filed on Jul. 11, 2012, now Pat. No. 8,423,495, which is a division of application No. 12/833,910, filed on Jul. 9, 2010, now Pat. No. 8,244,661, which is a continuation of application No. 12/237,059, filed on Sep. 24, 2008, now Pat. No. 7,756,807, which is a division of application No. 11/152,689, filed on Jun. 13, 2005, now Pat. No. 7,454,430.

(60) Provisional application No. 60/580,924, filed on Jun. 18, 2004.

(51) Int. Cl.
*G06F 17/00* (2006.01)
*G06N 5/02* (2006.01)

(52) U.S. Cl.
USPC .......................................................... 706/46

(58) Field of Classification Search
None
See application file for complete search history.

(56) References Cited

U.S. PATENT DOCUMENTS

| | | | |
|---|---|---|---|
| 5,799,276 A | 8/1998 | Komissarchik et al. | |
| 5,855,020 A | 12/1998 | Kirsch | |
| 6,269,370 B1 | 7/2001 | Kirsch | |
| 6,397,185 B1 | 5/2002 | Komissarchik et al. | |
| 6,584,191 B1 | 6/2003 | McPartlan et al. | |
| 6,744,878 B1 | 6/2004 | Komissarchik et al. | |
| 6,850,613 B2 | 2/2005 | McPartlan et al. | |
| 6,963,813 B1 | 11/2005 | Rathei et al. | |
| 7,043,007 B2 * | 5/2006 | McPartlan et al. | 379/265.02 |
| 7,191,163 B2 | 3/2007 | Herrera et al. | |
| 7,356,522 B2 | 4/2008 | Herrera et al. | |
| 7,454,430 B1 * | 11/2008 | Komissarchik et al. | 1/1 |

(Continued)

OTHER PUBLICATIONS

Abe et al, Robust pointing by XPath language: authoring support and empirical evaluation, Applications and the Internet, 2003, Proceedings, Symposium on Publication Year 2003; pp. 156-165.

(Continued)

*Primary Examiner* — Michael B Holmes
(74) *Attorney, Agent, or Firm* — Foley & Lardner LLP

(57) ABSTRACT

Provided are methods and systems that extract facts of unstructured documents and build an oracle for various domains. The present invention addresses the problem of efficient finding and extraction of facts about a particular subject domain from semi-structured and unstructured documents, makes inferences of new facts from the extracted facts and the ways of verification of the facts, thus becoming a source of knowledge about the domain to be effectively queried. The methods and systems can also extract temporal information from unstructured and semi-structured documents, and can find and extract dynamically generated documents from Deep or Dynamic Web.

7 Claims, 19 Drawing Sheets

(56) References Cited

U.S. PATENT DOCUMENTS

| | | | |
|---|---|---|---|
| 7,756,807 B1* | 7/2010 | Komissarchik et al. | 706/46 |
| 7,849,045 B2 | 12/2010 | Herrera et al. | |
| 7,937,358 B2 | 5/2011 | Herrera et al. | |
| 8,244,661 B1* | 8/2012 | Komissarchik et al. | 706/46 |
| 8,423,495 B1* | 4/2013 | Komissarchik et al. | 706/46 |
| 2006/0117294 A1 | 6/2006 | Vogler | |

OTHER PUBLICATIONS

Gautam et al, Link contexts in classifier-guided topical crawlers, Knowledge and Data Engineering, IEEE Transactions on vol. 18, Issue 1, Jan. 2006 pp. 107-122 Digital Object Identifier 10.1109/TKDE.2006.12.

Kunhui, Estimation of Optimal Topic Spider Strategy by Use of Decision Trees, Control and Automation, 2007. ICCA 2007, IEEE International Conference on May 30, 2007-Jun. 1, 2007 pp. 2806-2809 Digital Object Identifier 10.11 0911CCA.2007.4376873.

Lingras et al, Adaptive hyperlinks using page access sequences and minimum spanning trees, Fuzzy Systems Conference, 2007. FUZZ-IEEE 2007. IEEE International Jul. 23-26, 2007 pp. 1-6Digital Object Identifier 10.11 09/FUZZY.2007.4295422.

Notice of Allowance Dated Apr. 12, 2012 for U.S. Appl. No. 12/833,910.

Notice of Allowance Dated Feb. 17, 2012 for U.S. Appl. No. 13/546,960.

Notice of Allowance Dated Mar. 12, 2010 for U.S. Appl. No. 12/237,059.

Synytskyy et al, Robust Multilingual Parsing Using Island Grammars, Oct. 2003 CASCON '03: Proceedings of the 2003 conference of the Centre for Advanced Studies on Collaborative research Publisher: IBM Press ACM Portal.

U.S. Office Action dated Feb. 5, 2010 for U.S. Appl. No. 12/237,059.

U.S. Office Action Dated Dec. 30, 2011 for U.S. Appl. No. 12/833,910.

Zhu, An Algorithm OFC for the Focused Web Crawler, Machine Learning and Cybernetics, 2007 International Conference on vol. 7, Aug. 19-22, 2007 pp. 4059-4063 Digital Object Identifier 10.11 09/ICMLC.2007.4370856.

\* cited by examiner

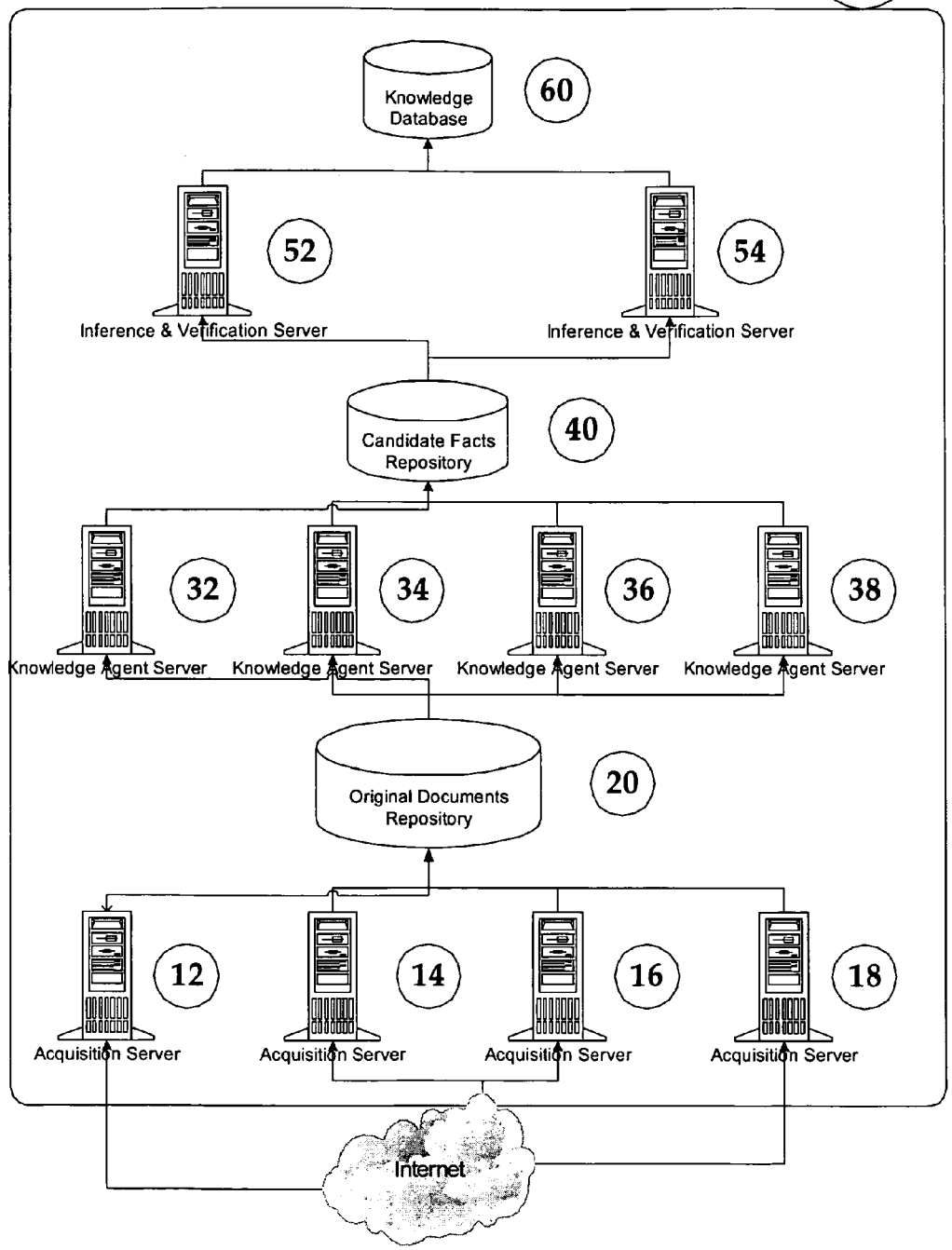

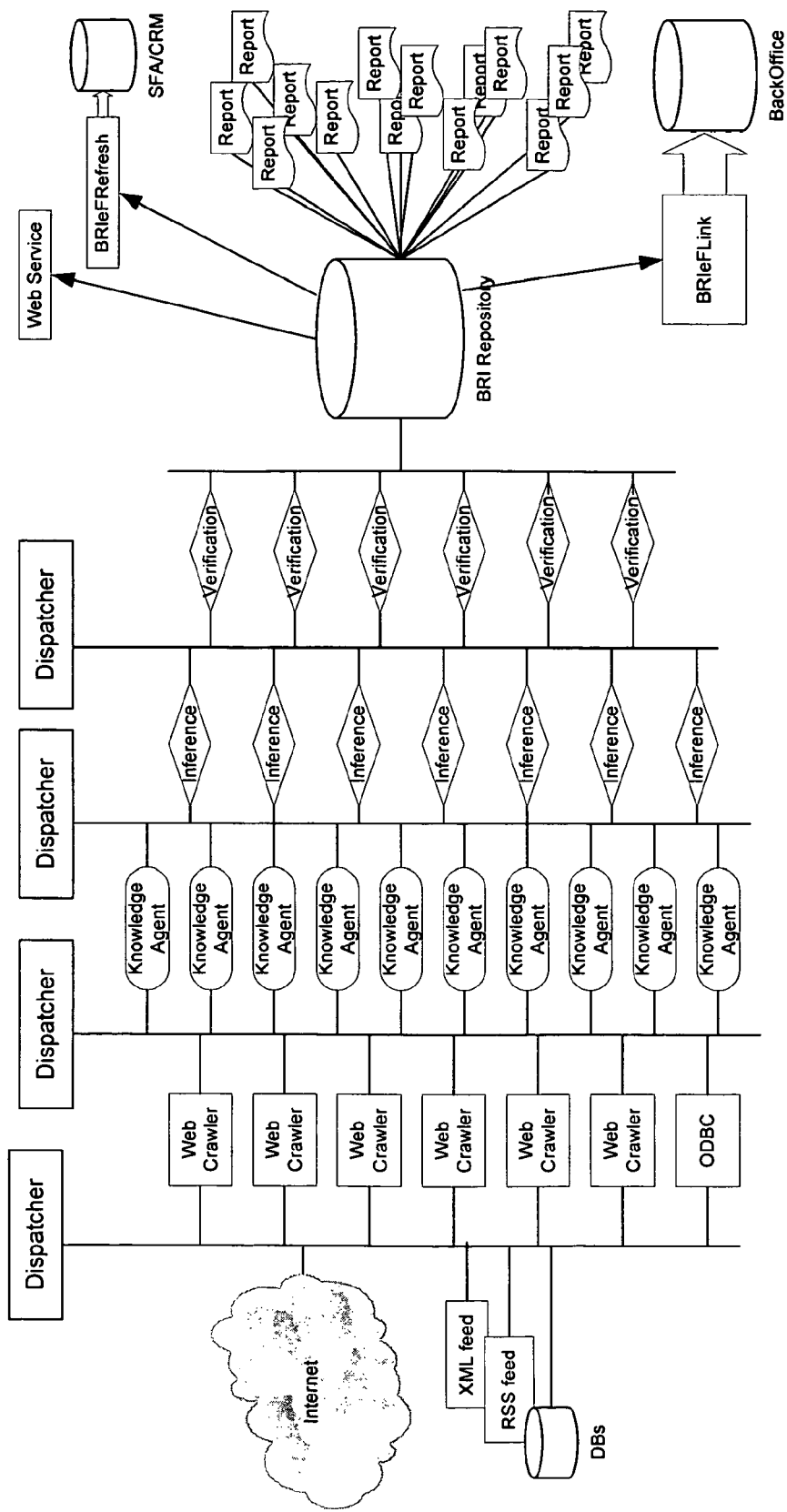
Figure 2: System Architecture

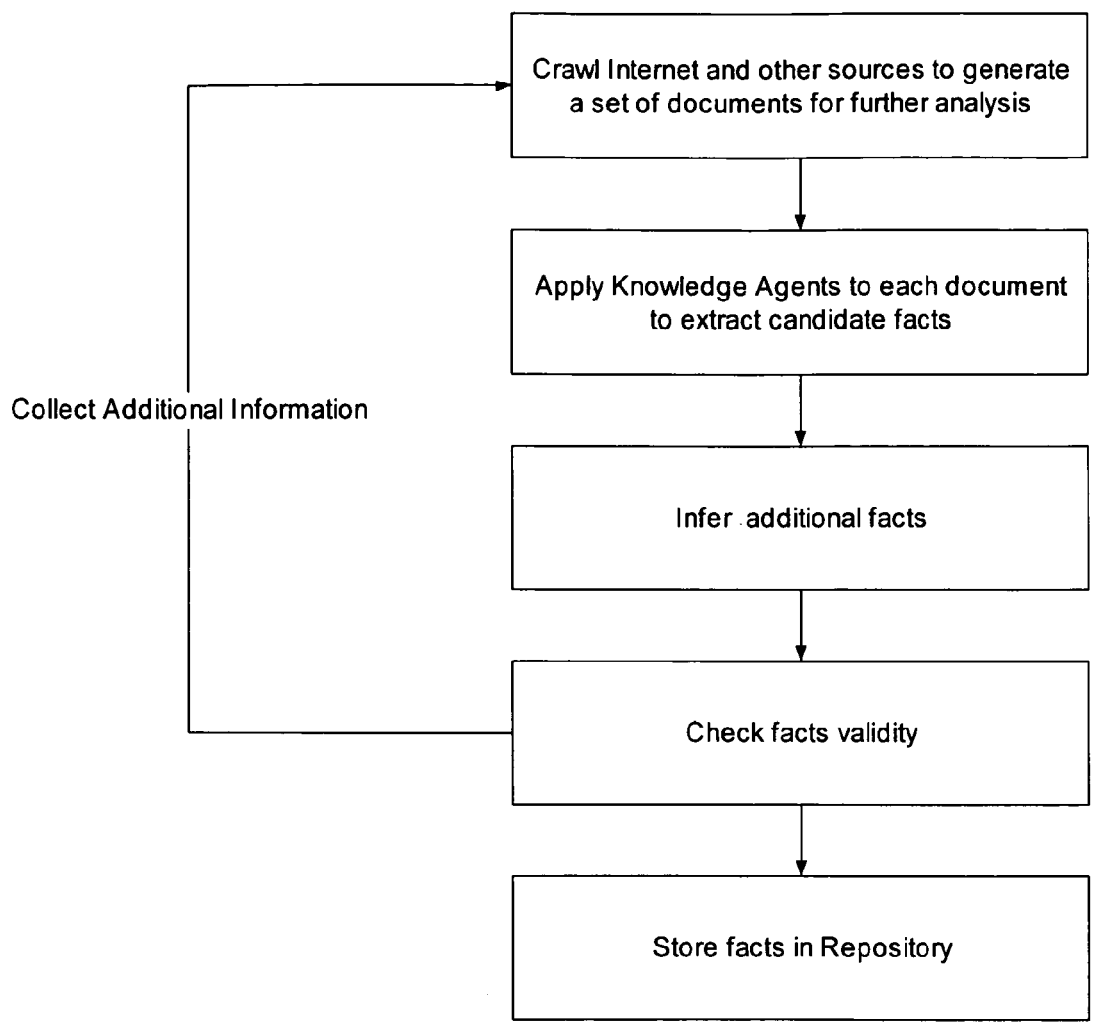

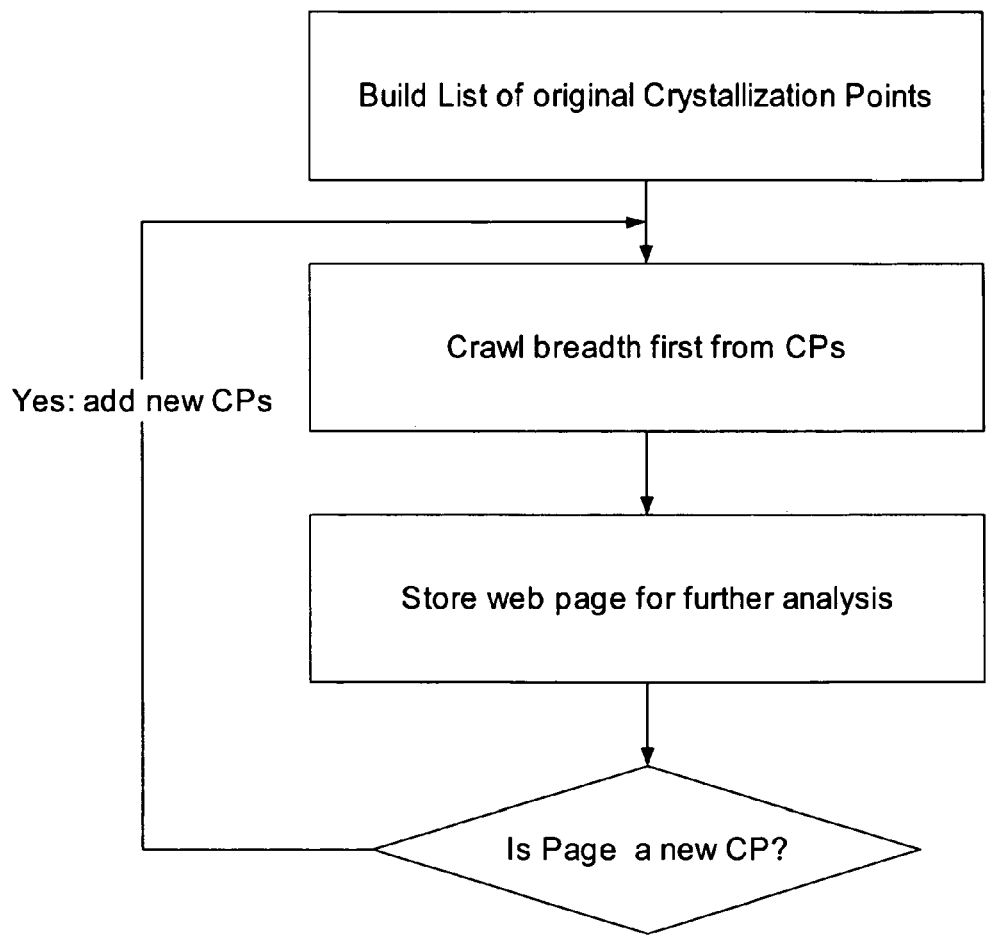
FIGURE 4: WEB CRAWLING AND CRYSTALLIZATION POINTS

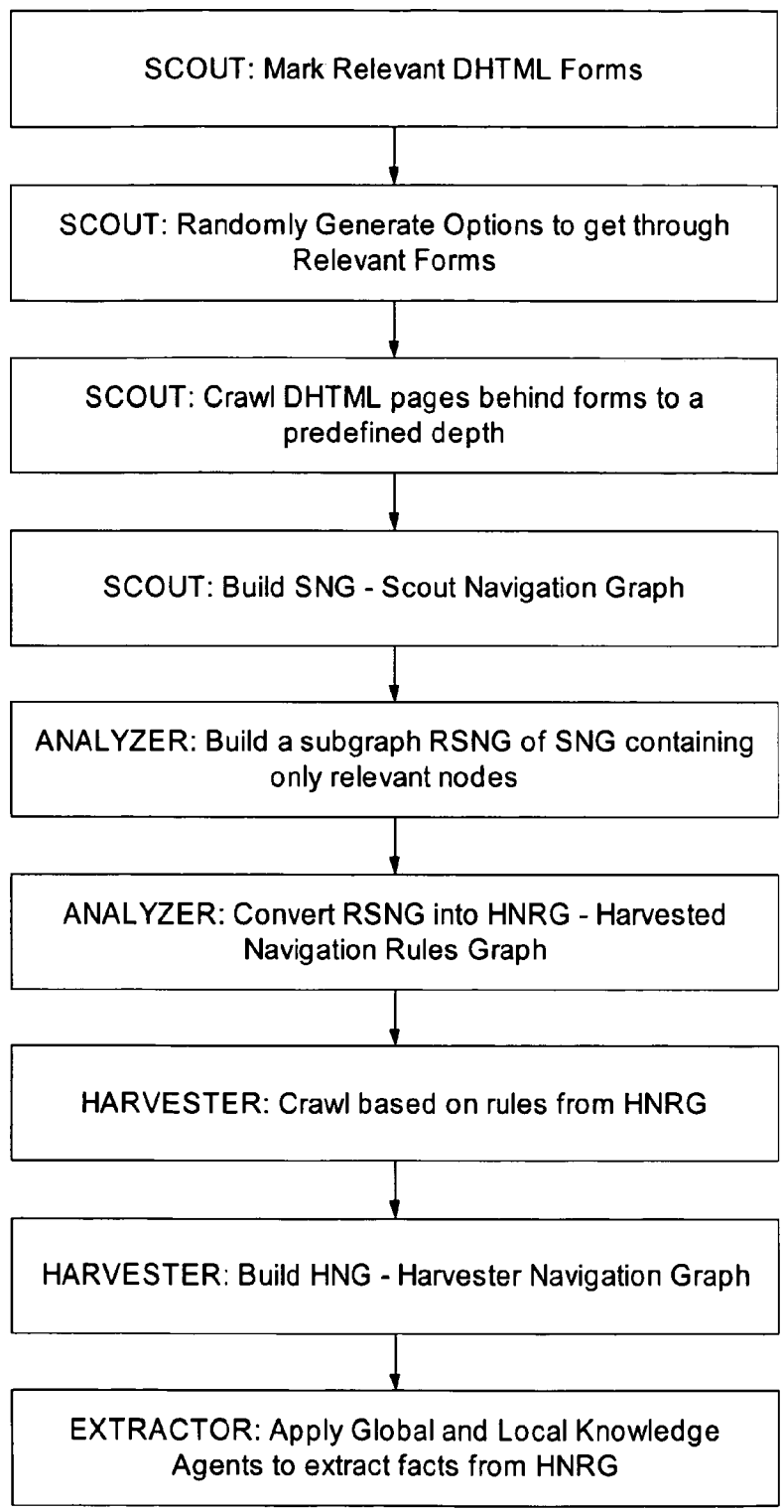
FIGURE 5: DEEP WEB CRAWLING

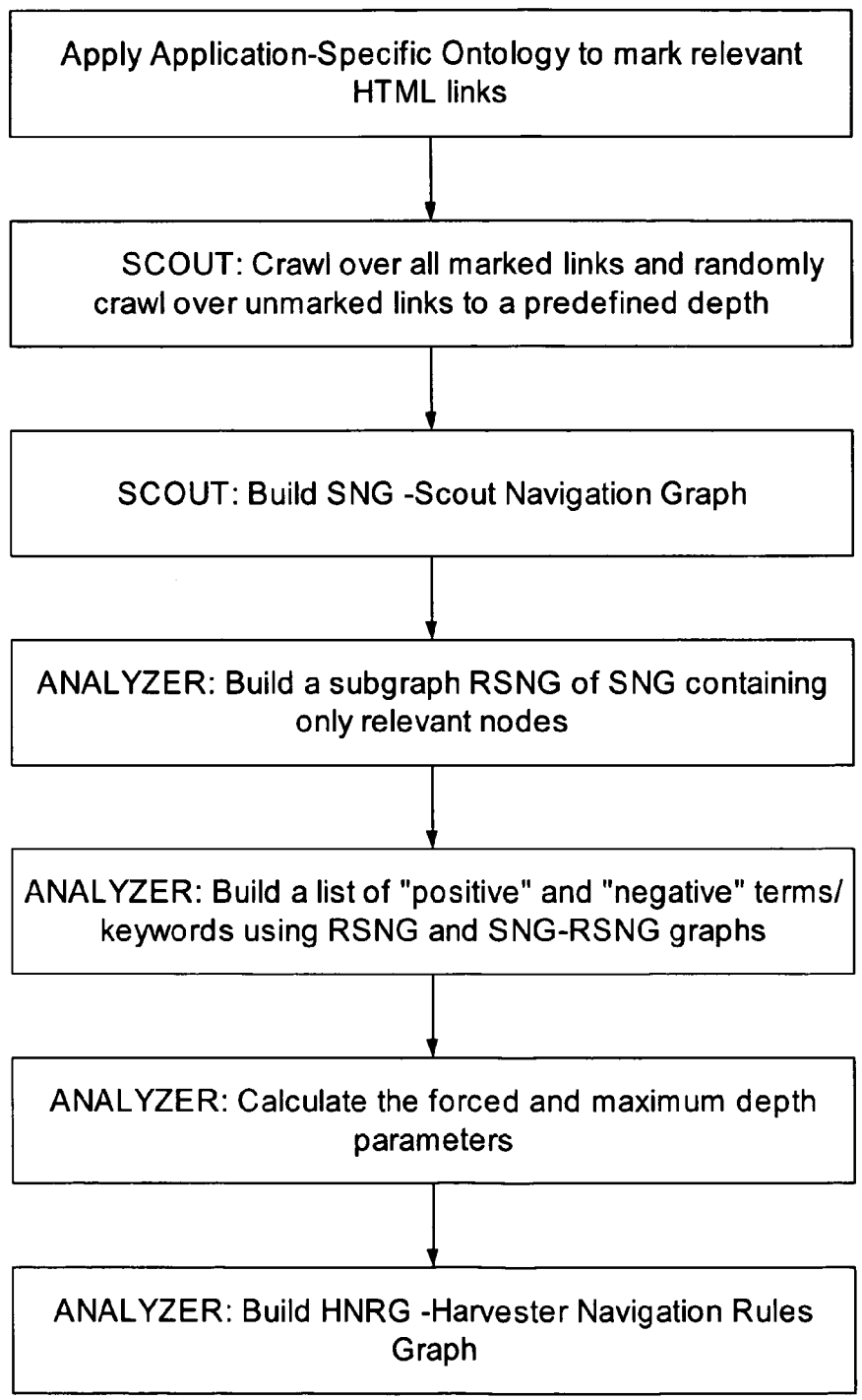
FIGURE 6: FALSE NEGATIVE RATE REDUCTION IN CRAWLING - AUTOMATIC DETERMINATION OF CP CRAWLING PARAMETERS

FIGURE 7: LAYOUT RECOGNITION
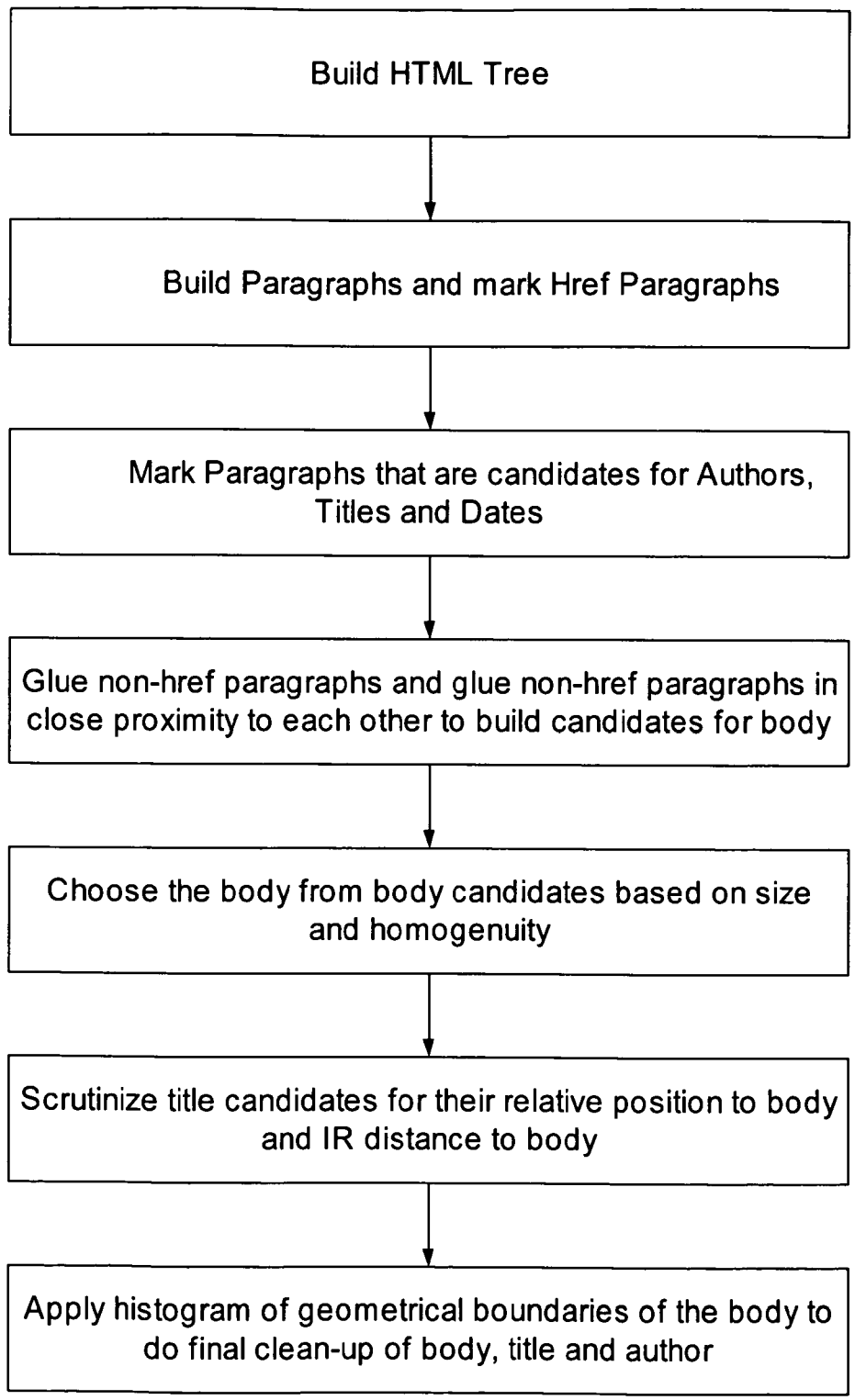

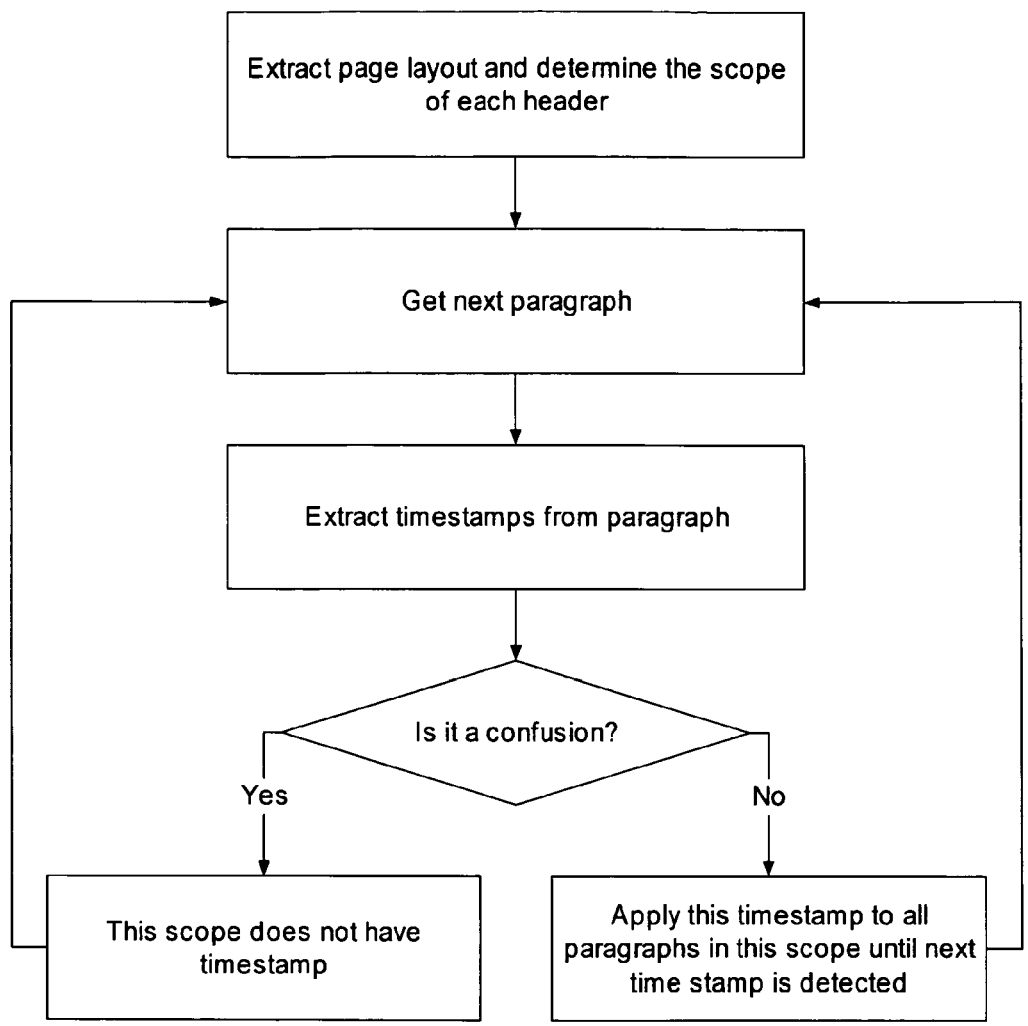

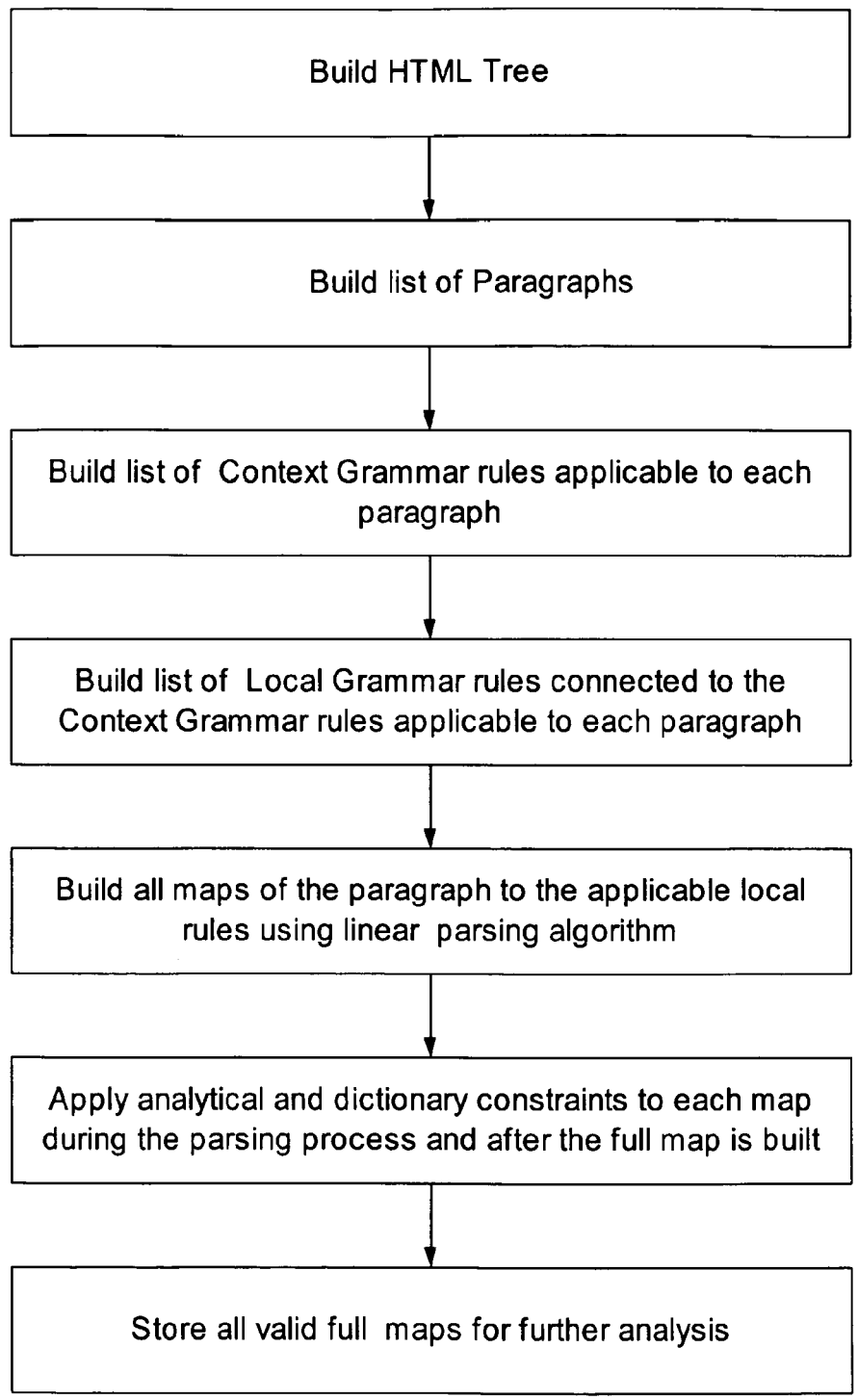

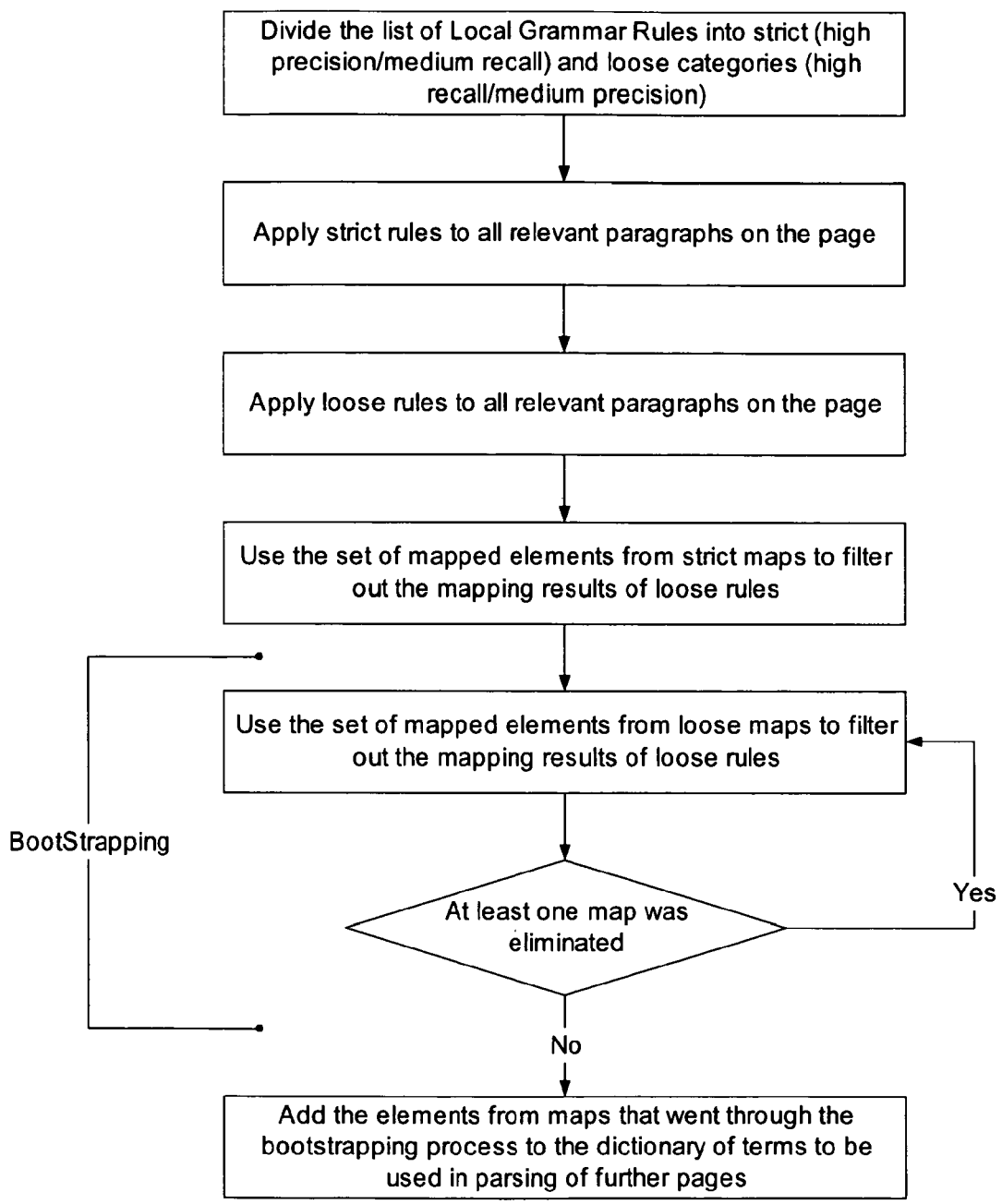
FIGURE 10: MULTI-PASS BOOTSTRAPPING

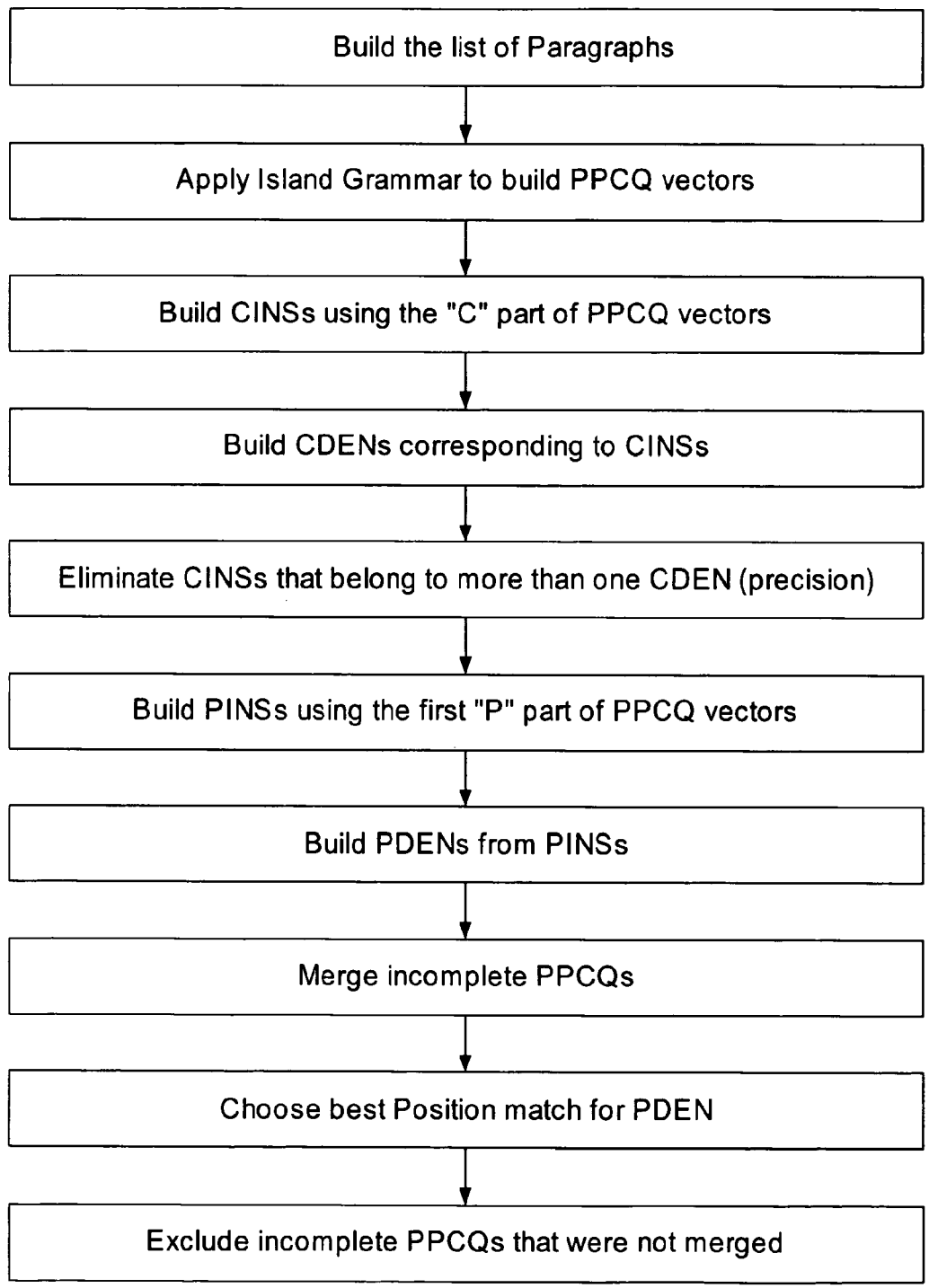

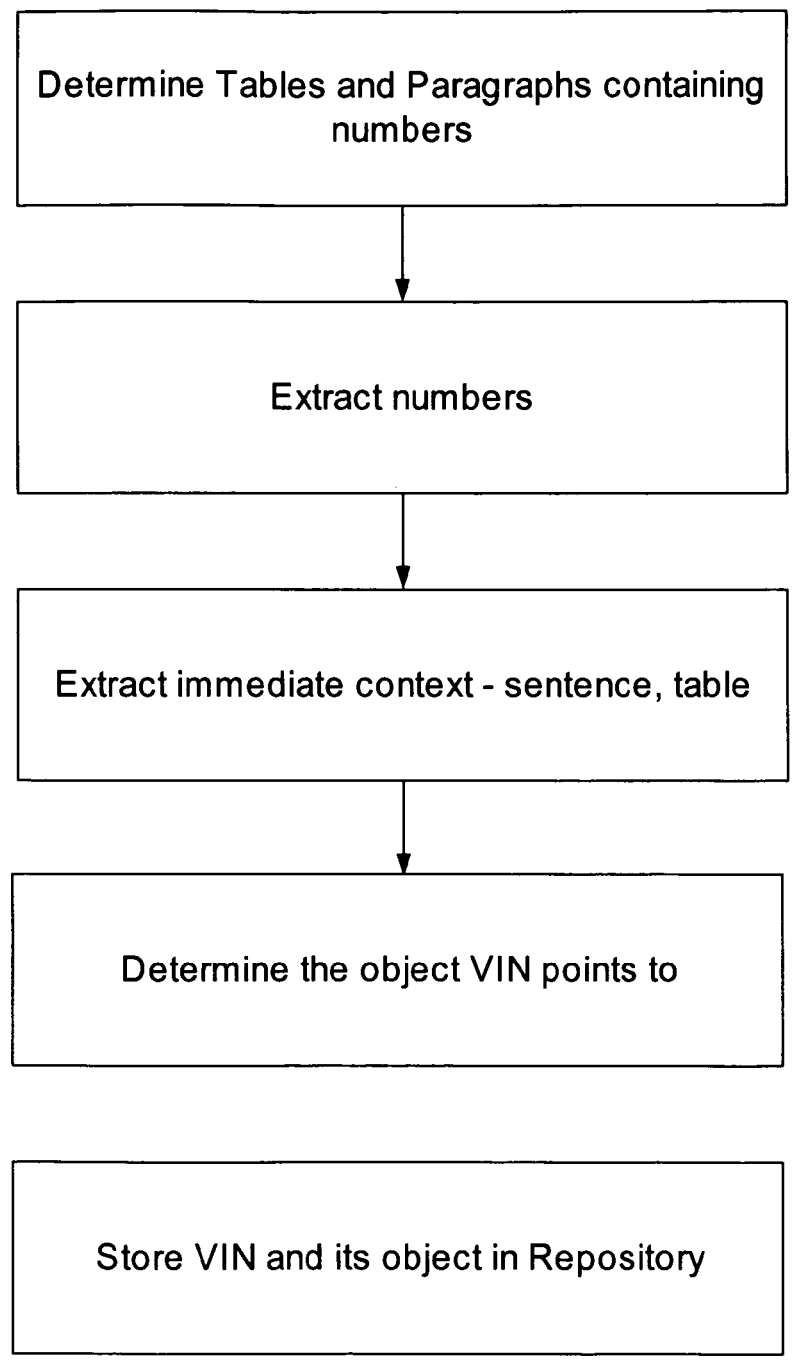
FIGURE 12: VERY IMPORTANT NUMBERS (VINs)

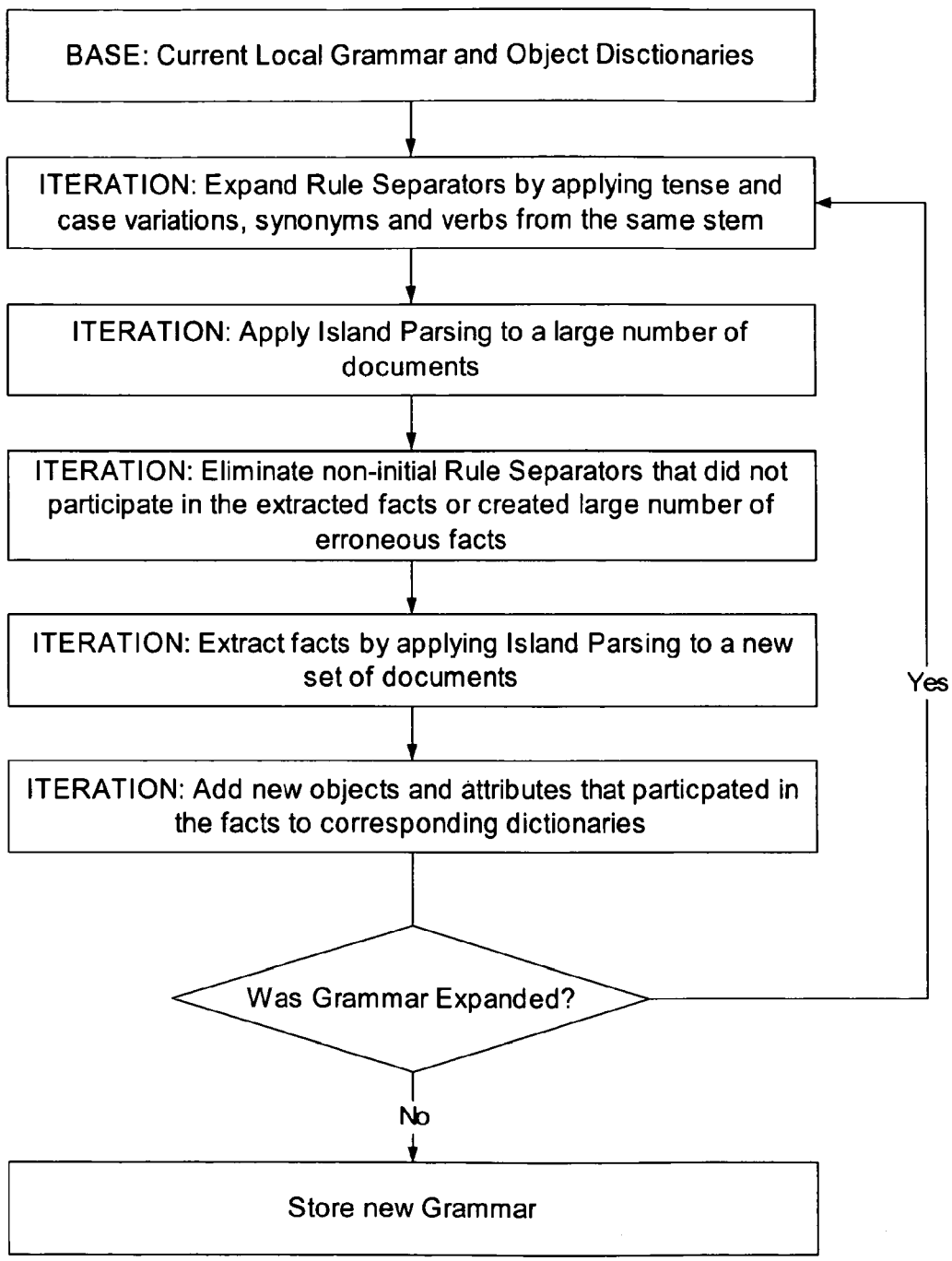
FIGURE 13: AUTOMATIC EXPANSION OF LOCAL GRAMMAR RULES

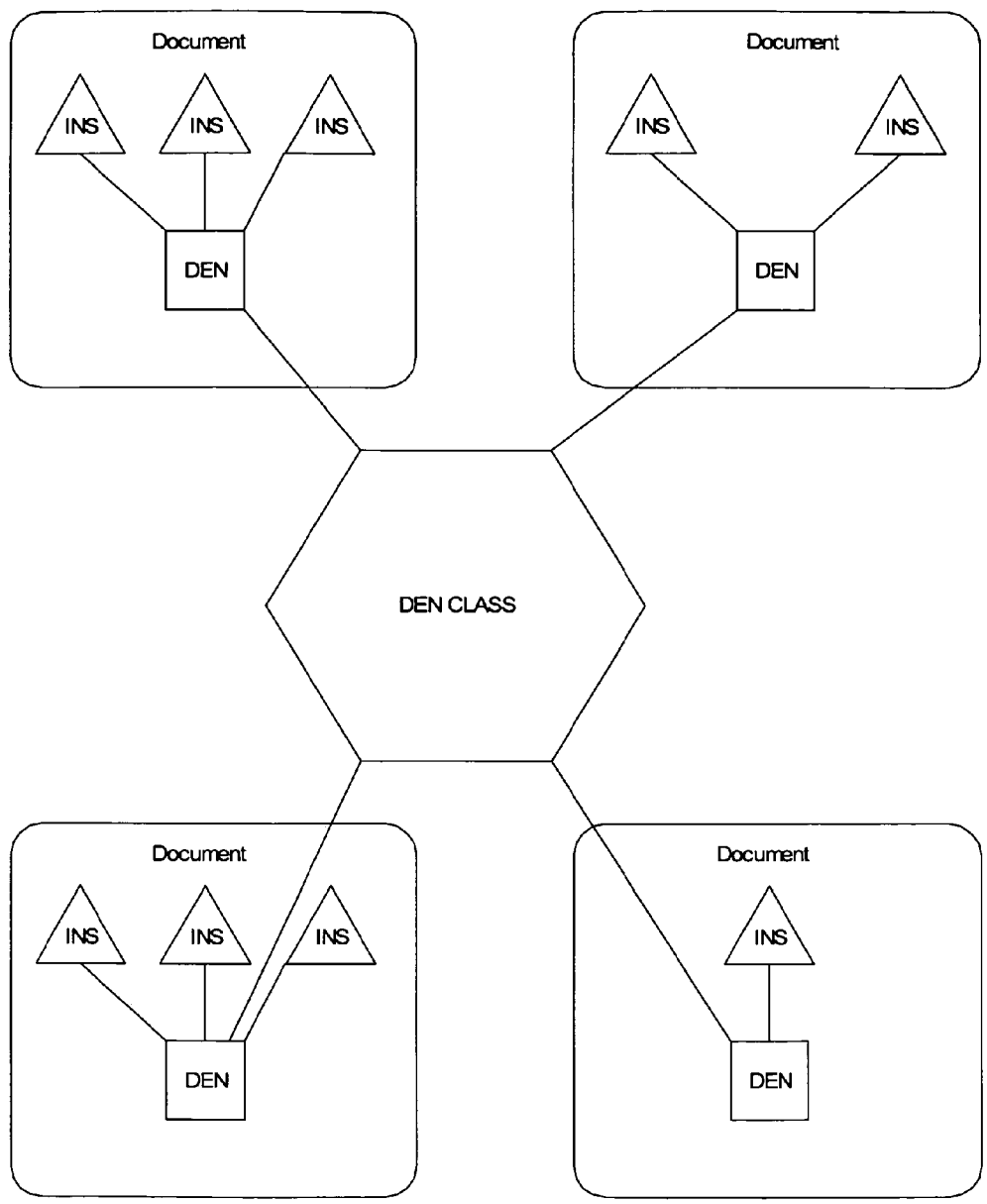
FIGURE 14: THREE LAYERS OF OBJECT IDENTIFICATION

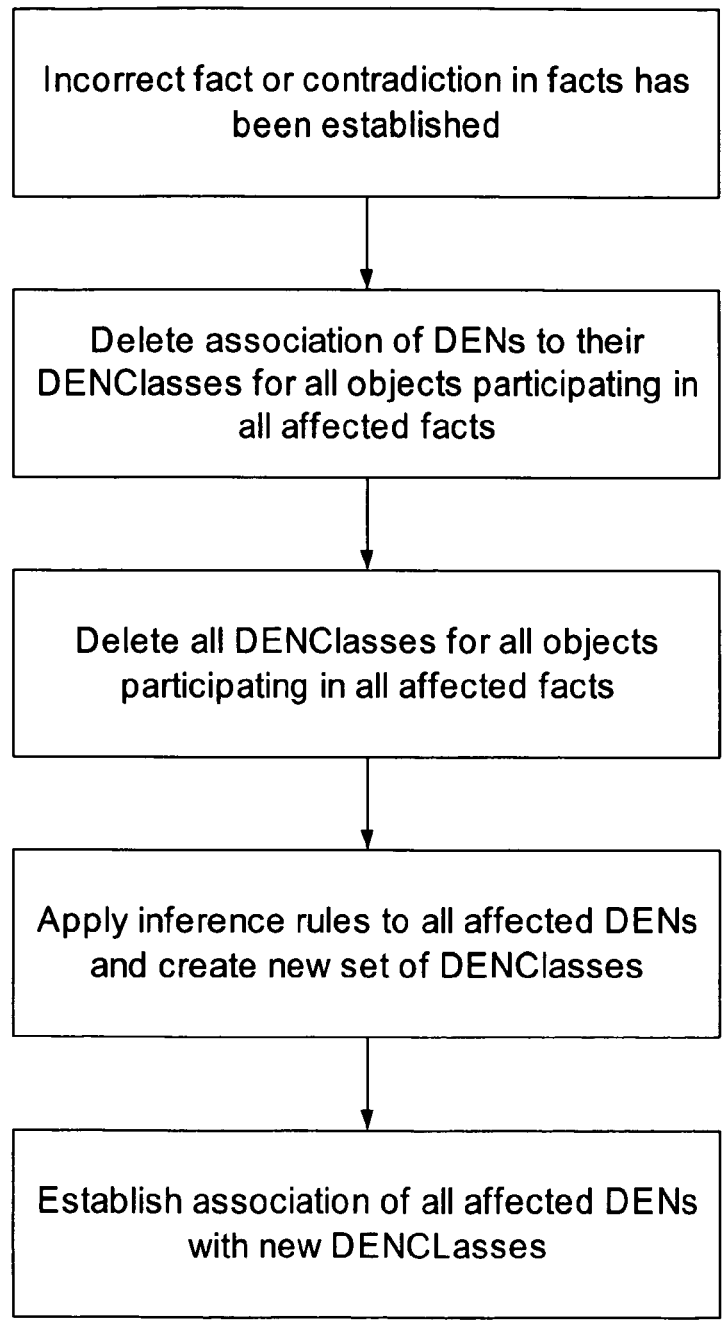
FIGURE 15: ROLL FORWARD INCORRECT OBJECT IDENTIFICATION RECOVERY

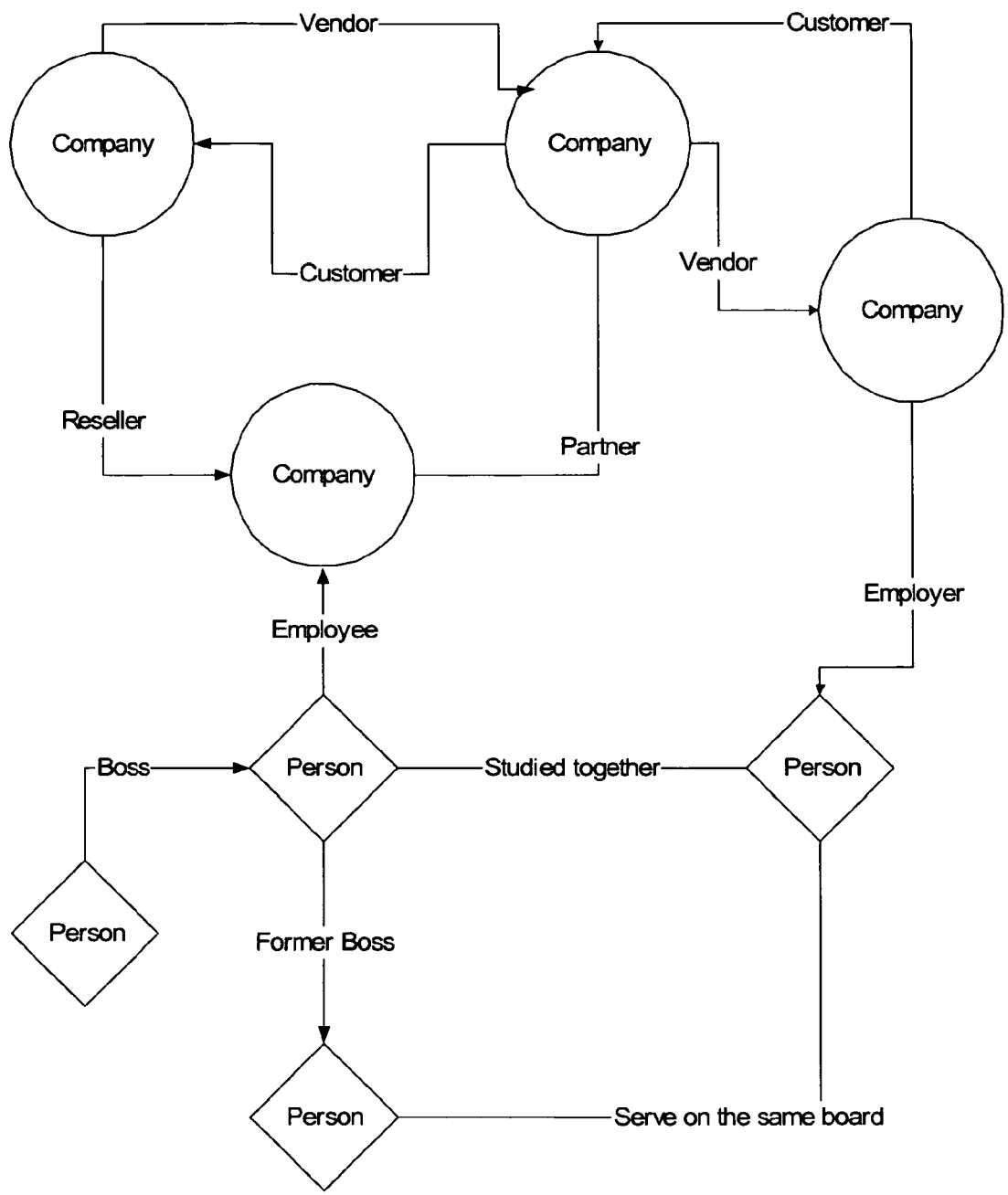
FIGURE 16: BUSINESS RELATIONSHIPS

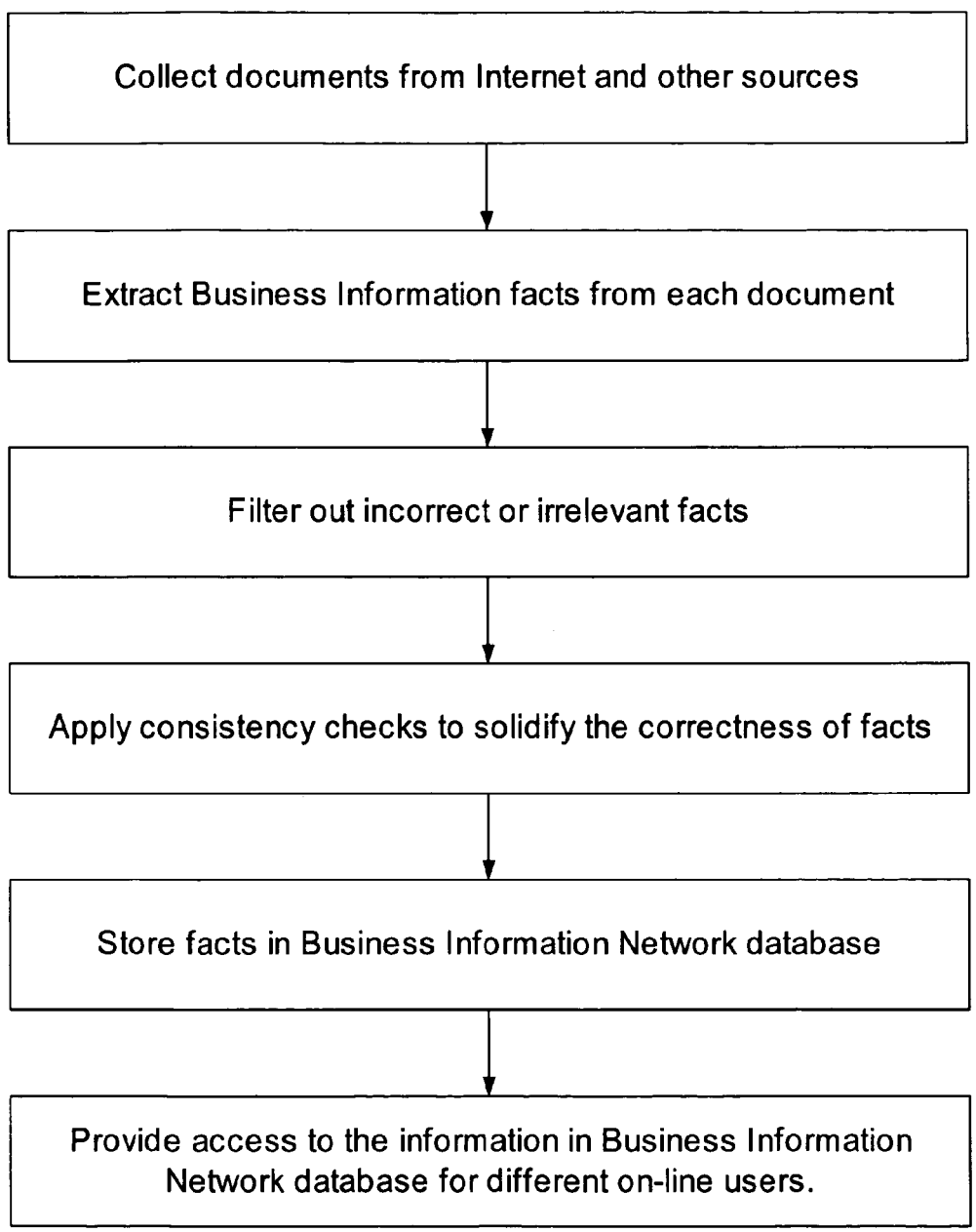
FIGURE 17: BUSINESS INFORMATION NETWORK GENERATION PROCESS

FIGURE 18: IMPLICIT SOCIAL NETWORK
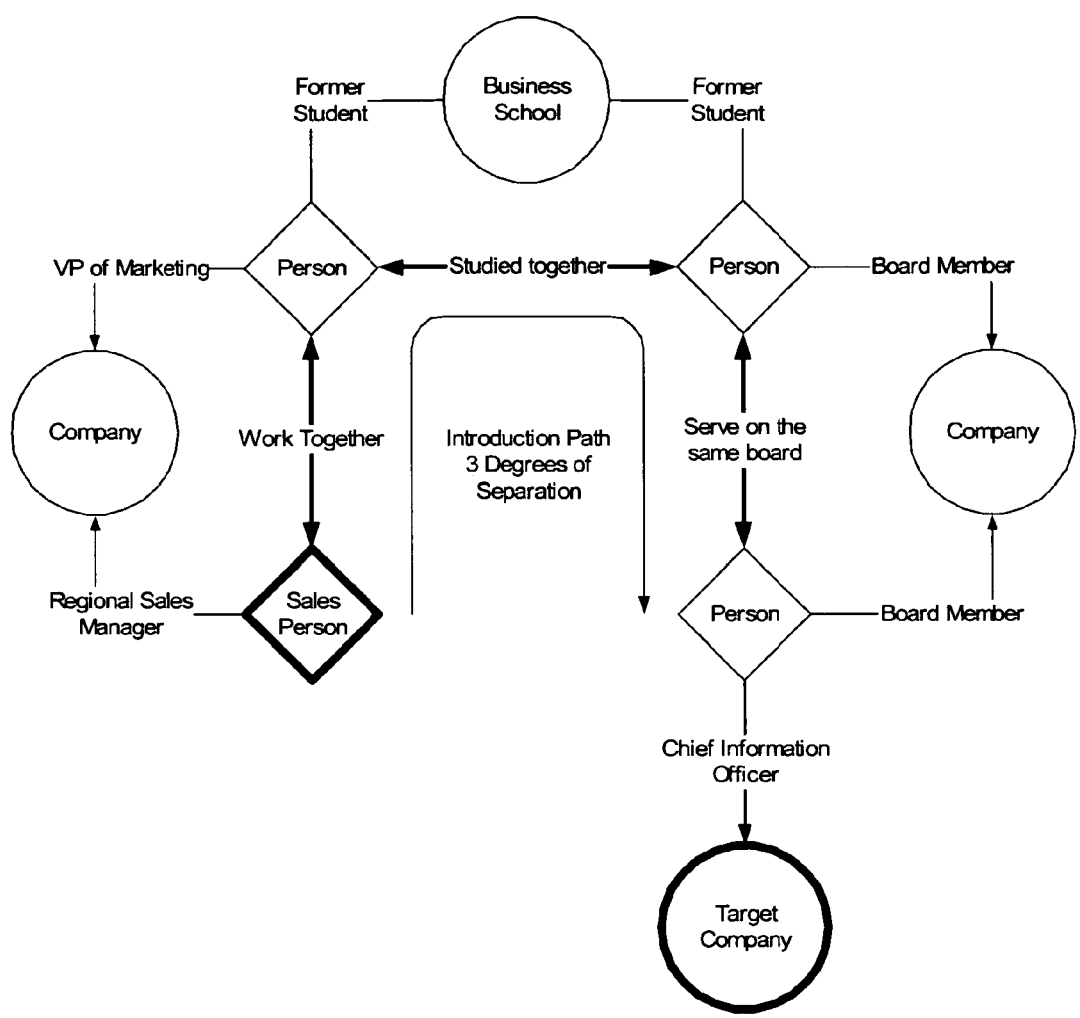

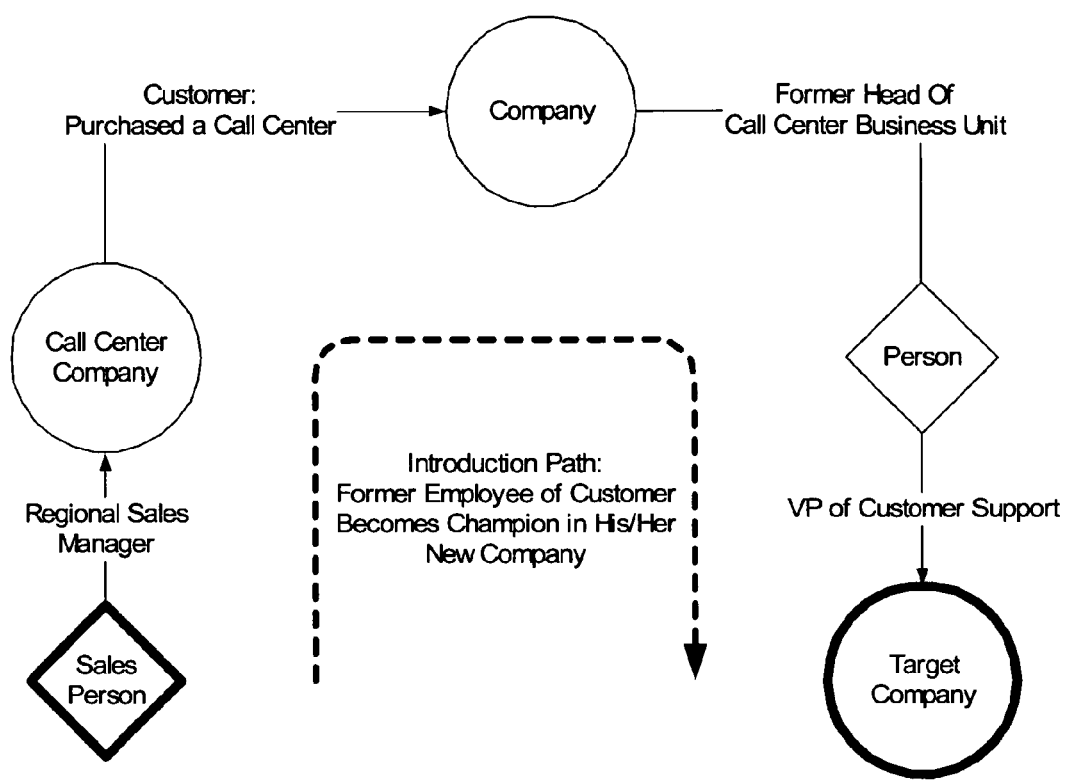
FIGURE 19: CUSTOMER ALUMNI NETWORK

SYSTEM AND METHOD FOR FACTS EXTRACTION AND DOMAIN KNOWLEDGE REPOSITORY CREATION FROM UNSTRUCTURED AND SEMI-STRUCTURED DOCUMENTS

CROSS-REFERENCE TO RELATED APPLICATIONS AND CLAIM OF PRIORITY

This application is a divisional of U.S. Ser. No. 13/546,960, filed on Jul. 11, 2012, which is a divisional of U.S. Ser. No. 12/833,910, filed on Jul. 9, 2010, which is a continuation of U.S. Ser. No. 12/237,059, filed on Sep. 24, 2008, which is a divisional of U.S. Ser. No. 11/152,689, filed Jun. 13, 2005, each of which claim the benefit of U.S. Ser. No. 60/580,924, filed Jun. 18, 2004. All of which are fully incorporated herein by reference in their entirety.

BACKGROUND

1. Field of the Invention

This invention relates generally to methods and systems for information retrieval, processing and storing, and more particularly to methods and systems of finding, transforming and storage of facts about a particular domain from unstructured and semi-structured documents written in a natural language.

2. Description of the Related Art

The transformation of information from one form to another was and still is quite a formidable task. The major problem is that the purpose of information generation in the first place is communication with human beings. This assumption allowed and forced the use of loosely structured or purely unstructured methods of information presentation. A typical example would be a newspaper article. Sometimes the information is presented in a little more structured form like in a company's press release, or in SEC 10-K form. But even in the latter case the majority of information is presented using plain (e.g. English) language. With the information explosion there has been, particularly with the Internet, the need for aggregation and automatic analysis of the virtually infinite amount of information available to the public became apparent and urgent. The fundamental problem with this analysis is in the very fact that the information is originated by human beings to be consumed by human beings. So, to perform aggregation and automatic analysis of this information a computer needs to transform/translate semi-structured or completely unstructured text into a structured form. But to do that one needs to create a machine that can understand natural language—this task is still far beyond the grasp of AI community. Furthermore, to understand something means not only to recognize grammatical constructs, which is a difficult and expensive task by itself, but to create a semantic and pragmatic model of the subject in question.

A number of scientists and businesses tried to solve this problem by creating a statistically generated ontology of a subject area and generating tools to navigate the Internet and other sources of information using this ontology and key words. Some of them went even further and generated the "relevance" index to prioritize pieces of information (e.g. web pages) by their "importance" and "relevance" to the question (e.g. Google™).

The fundamental problem with this approach is that it still does not perform the task at hand—"analyze and organize the sea of information pieces into a well managed and easily accessible structure".

Transformation of information contained in billions and billions of unstructured and semi-structured documents that are now available in electronic forms into structured format constitutes one of the most challenging tasks in computer science and industry. The Internet created a perception that everything one needs to know is at his/her fingertips. Search engines strengthen this perception. But the reality is that the existing systems like Google™ Yahoo™ and others have two major drawbacks: (a) They provide only answers to isolated questions without any aggregations; so there is no way to ask a question like "How many CRM companies hired a chief privacy officer in the last two years?", and (b) the relevancy/false positive number is between 10% and 20% on average for non specific questions like "Who is IT director at Wells Fargo bank?" or 'Which actors were nominated for both an Oscar and a Golden Globe last year?" These questions require the system that collects facts and then present them in structured format and stored in a data repository to be queried using SOL-type of a language.

The following metaphor can be applied. Keyword search can be viewed as a process of sending scouts to find a number of objects that resemble what one is looking for. The system that converts unstructured data into a structured repository becomes an oracle that does not look for answers but just has the information ready.

The Internet has been generated by the efforts of millions of people. This endeavor could not be achieved without a flexible platform and language. HTML provided such a language and with its loose standards has been embraced worldwide. But this flexibility is a mixed blessing. It allows for unlimited capabilities to organize data on a web page, but at the same time makes its analysis a formidable task. Though there is no theoretical possibility to create an algorithm to analyze page structure of an arbitrary web page, the fact that the ultimate goal of a page is to be read by a human being makes the problem practically solvable.

The Major challenge of the information retrieval field is that it deals with unstructured sources. Furthermore, these sources are created for human not machine consumption. The documents are organized to match human cognition process that is based on using conventions and habits immanent to a multi-sense, multi-oracle perception.

Examples of multi-sense perception include the conventions that dictate the position of a date in a newspaper (usually on the top line of a page, sometimes on the bottom line, or in a particular frame close to the top of the page) or continuation of the article in the next column with the consideration of a picture or horizontal line dividing the page real estate into areas. Examples of multi-oracle perception mechanisms include the way companies describe their customers—it can be a press release, it can be a list of use cases, a list of logos, or simply a list of names on a page called "Our customers".

With the increase of throughput the Internet pages become more and more complex in structure. Now they include images, sounds, videos, flashes, complex layout, dynamic client side scripting, etc. This complexity makes the problem of extraction of units like an article quite problematic. The problem is aggravated by the lack of standards and the level of creativity of web masters. Some hopes can be placed on the emerging semi-structured data feed standards like RSS, but the web pages that mimic the centuries old tradition of presenting news on page for human eyes are here to stay.

The problem of extracting main content and discarding all other elements present on a web page constitutes a formidable challenge. At the moment the status quo is that the automatic systems that "scrape" articles from different web sites for consolidation or analysis use so-called templates. Templates are formal descriptions of a way how a webmaster of a particular newspaper presents the information on the web. The templates constitute three major challenges. Firstly, one needs to maintain many thousands of them. Secondly, they have to be updated on a regular basis due to ever changing page structures, new advertisement, and the like. Because newspapers do not notify about these changes, the maintenance of templates require constant checking. And thirdly, it is quite difficult to be accurate in describing the article, especially its body, since each article has different attributes, like the number of embedded pictures, length of title, length of body etc.

Temporal information is critical for determination of relevancy of facts extracted from a document. There are two problems to be addressed. One is to extract time stamp(s) and another one is to attribute the time stamp(s) to the extracted facts. The second problem is closely related to the recognition of HTML document layout including determination of individual frames, articles, lists, digests etc. The time stamp extraction process should be supplemented with the verification procedure and strong garbage model to minimize false positive results.

A time stamp can be either explicit or implicit. An explicit time stamp is typical for press release, newspaper articles and other publications. An implicit time stamp is typical for the information posted on companies' websites, when it is assumed that the information is current. For example, executive bios and lists of partners typically have an implicit time stamp. The date of a document with an implicit time stamp is defined as a time interval when a particular fact was/is valid.

Implicit time stamp extraction is straightforward. When a fact is extracted from a particular page for the first time, the lower bound of the time interval is set to the date of retrieval—we can assume that the fact was valid at least at the day of retrieval and possibly earlier. At the same time the upper bound of the time interval is also set to the date of the retrieval—we can assume that the fact was valid on the day of retrieval. As the crawler revisits the page and finds it and the facts unchanged the upper bound of the time interval is increased to the date of the visit (the fact continues to hold on the date of the visit).

Explicit time stamps are much harder to extract. There are three major challenges: (1) multi-document nature of a web page; (2) no uniform rule of placing time stamps and (3) false clues. Typical examples of a multi-document page are a publication front page in a form of a digest or a digest of a company's press releases.

In the case of newspaper, the convention is that the top of the page contains the today's date, and all articles are presumed being time stamped with this date. The situation with a web page is much more complex, since with the development of convenient tools for web page design people became quite creative. Nevertheless, the overall purpose of the web page—to distribute information in a way convenient to a reader—keeps the layout of a page from becoming completely wild. That is even more applicable to business-related articles, where the goal is to produce easily scannable documents for busy business readers. In most cases, the time stamp of an article is positioned at the top of a document, while the documents on the page are positioned in a sequential order looking from html tags prospective.

The variety of the ways how documents created by humans represent the same facts, demands the system that needs to recognize and extract them to be a hybrid one. That is why homogeneous mechanisms can not function properly in an open world, and thus rely on constant tuning or on focusing on a well defined domain.

For a long time, the main thrust in Information Retrieval field was in building mechanisms to deal with the ever growing amount of available information. With the explosion of the Internet, the problem of scalability became critical. For keyword based search systems, scalability is straightforward. For a system of facts, extraction like Business Information Network, the problem of scalability is significantly more complex. That is because facts about the same object occur in different documents, and thus should be collected separately but used together to infer additional facts and to verify or refute each other, and to build a representative description of an object.

The original premise of Information Retrieval was to create mechanisms to retrieve relevant documents with as low as possible number of false negative (missed) and false positive (not-relevant) ones. All existing search engines are based on that premise with the emphasis on low false negative part. The relevancy (false positive rate) of search results is a very delicate subject, which all search vendors try to avoid. As a matter of fact, independent studies showed that a typical keyword search of a business person like "Wells Fargo"+"IT Director" generates up to a thousand url links out of which just 10% are relevant and even they are located all over the place; the probability to see a relevant link in the first page of search results (first 10 links) is practically the same as the probability to see it on the 90th page (links 900 to 910). As opposed to search engines, the system that provides answers simply can't afford to have high level of false positive rate. The system becomes useless (unreliable) if false positive rate is higher than a single digit. To provide that level of quality, the system should employ special protective measures to verify the facts stored in its repository.

URL-based (static) Internet currently consists of more than 8 billion pages and grows with the speed of 4 million pages per day. These do not reflect so-called Deep Web or dynamically generated request-response web pages that represent one order of magnitude more than the static Internet. That humongous size of the search space presents significant difficulty for crawlers, since it requires hundreds of thousands computers and hundreds of gigabits per second connections. There is a very short list of companies like Google™, Microsoft™ Yahoo™ and Ask Jeeves™, which can afford to crawl the entire Internet space (static pages only). And if the task is to provide a user with a keywords index to any page on the Internet, that is the price to pay. But for many tasks that is neither necessary nor sufficient.

If one looks at the problem of using the Internet as a source of answers to a particular set of questions and/or to use the Internet to provide information to a particular application, the desire is to look only at "relevant" pages and never even visit all others. The problem is how to find these pages without crawling the entire Internet. One of the solutions is to use search portals like Google™ to narrow the list of potentially relevant pages using keyword search. That approach assumes advance knowledge of keywords that are used in the relevant pages. Also it assumes that third party (Google™ et al.) database can be used to do massive keyword requests. Also the number of pages to be extracted and to be analyzed can significantly supersede the number of relevant pages.

Static Internet constitutes just a small fraction of all documents available on the Web. Deep or dynamic web constitutes a significant challenge for web crawlers. The connections between web pages are presented in a dynamically generated manner. To define the question, the DHTML forms are used. The page that is rendered does not exist and is generated after the request for it is made. The content is typically contained in the server database and the page is usually a mix of predefined templates (text, graphic, voice, video etc.) and the results of dynamically generated database queries. Airlines web sites provide a very good example of ratio between static pages on web site and the information available about flights. Online dictionaries show even more dramatic ratio between the size of surface and deep web, where the deep web part constitutes 99.99% while the static web part is mere 0.01%.

Since the main issue in dealing with the dynamic web is that the answer is rendered only to the rightfully presented question, a mechanism that deals with the Deep Web should be able to recognize what type of questions should be asked and how they should be asked, and then be able to generate all possible questions and analyze all the answers. At the moment Deep Web is not tackled by the search vendors and continues to be a strong challenge.

Typical examples are travel web sites and job boards. Furthermore, now practically any company website contains forms, e.g. to present the list of press releases. The major problem is to find out what questions to ask to retrieve the information from the databases, and how to obtain all of it.

NLP parsing is a field that was created in the 1960's by N. Chomsky's pioneer work on formal grammars for natural languages. Since that time, a number of researches tried to create efficient mechanisms to parse a sentence written in a natural language. There are two problems associated with this task. Firstly, no formal grammar of a natural language exists, and there are no indications that it will ever be created, due to the fundamentally "non-formal" nature of a natural language. Secondly, the sentences quite often either do not allow for full parsing at all or can be parsed in many different ways. The result is that none of the known general parsers are acceptable from the practical stand point. They are extremely slow and produce too many or no results.

Dictionaries play an important role in facts verification. The main problem though is how to build them. Usually some form of bootstrapping is used that starts with the building of initial dictionaries. Then an iterative processes use dictionaries to verify new facts and then these new facts help to grow dictionaries which in their turn allow extracting more facts etc. This general approach though can generate a lot of false results and specific mechanisms should be built to avoid that.

At the same time, even if the parser quickly generated a grammatical structure of a sentence, it does not mean that the sentence contains any useful information for a particular application. Semantic and pragmatic levels of a system are usually responsible for determination of relevancy.

One of the most difficult problems in facts extraction in Information Retrieval is the problem of identification of objects, their attributes and the relationships between objects. A typical information system contains a pre-defined set of objects. The examples are abundant. A dictionary is a classic example with objects being words chosen by the editors of the dictionary. In business information systems like Hoover's, the objects include a pre-defined list of companies. But if the system is built automatically, the decision whether a particular sequence of words represent a new object is much more difficult. It is especially tricky in the systems that analyze large number of new documents on a daily basis creating significant restrictions on the time spent on the analysis.

Thus, when a knowledge agent extracts a potential object, relationship or attribute, the more strict its grammar the less the number of false positives it produces. On the other hand, strictness of grammar limits its applicability. The success of the recursive verification depends on the level of heterogeneity of knowledge agents and the presence of documents describing the same objects using different grammatical constructs. The latter is quite typical for the Internet while heterogeneity depends on the system design.

An information system built from unstructured sources has to deal with the problem that objects and facts about them come from disparate documents. That makes identification of objects and establishing the equivalency between them a formidable task. Thus, if a web page containing an article describes a company as IBM while another one mentions International Business Machine, somehow the facts from both articles should be attributed to the blue chip company that is traded on New York Stock Exchange under the ticker IBM, has IRS number 130871985 and is headquartered in Armonk, N.Y. To be able to establish such determination special mechanisms should be developed.

A major challenge with facts extraction from a written document comes from the descriptive nature of any document. While describing a fact the document uses names of objects, not objects themselves. Thus, facts extraction faces a classic problem of instances vs. denotatum. There is no universal solution for that problem available. On the other hand since the purpose of the business-related documents is to communicate a message, there are rules that writers of these documents follow. For example, inside one document two different companies are not called by the same name (e.g. Aspect Communications and Aspect Lab will not be referred simply as Aspect if both are described in the same document, while the word Aspect can be used extensively in the document describing just Aspect Communications). Another important rule based on the fact that the object should be well defined; otherwise the message is confusing. In the case of a company, there is usually a paragraph describing the details about the company, such as the "About" section in a press release, or information about a company's location or its URL. Similar narrowing mechanisms are used for people. For example, mentioning of a person is done in a following way: " . . . ", said John Smith, vice president of operations at XYZ.com. Again, if the mechanisms are applied to a narrower domain the object identification procedures are easier to deal with than in a more general case.

Another challenge with such a system is that it should have mechanisms to go back on its decision on some equivalence without destroying others. To provide object identification and equivalence the inference mechanisms should be incorporated into the system.

One of the most common ways to introduce a person in an article is through the mentioning of the person's name, work affiliation and his/her quotes. This is how news articles and press releases are usually written. This "communication standard" constitutes one of the main sources of Business Information Network-related facts.

Quantitative information plays very a significant role in Information Retrieval. In the majority of the unstructured documents, the quantitative information in the form of numbers associated with a particular countable object. These numbers represent important pieces of information that are used to describe the detailed information related to the facts described in the document. We call these numbers VINs, Very Important Numbers. The examples of VINs in the case of business facts are: number of employees in a company, number of customer representatives, percent of the budget spent on a particular business activity, number of call centers, number of different locations, age of a person, his/her salary etc. If an information system has VINs in it, its usability is significantly higher. VINs always represent the most valuable part of any market analysis, lead verification, and sales calls. The countable objects VINS constitute a significant pool of information that helps to make right business decisions.

Extraction of entities and their relationships from a text, news article or product description, is done by using local grammars and island parsing approach. The problem with local grammars is that they are domain dependent and should be built practically from scratch for a new domain. The challenge is to build mechanisms that can automatically enhance the grammar rules without introducing false positive results.

For a long time, information systems vendors built the systems that had one kind of objects. The examples are people telephone directories, yellow pages etc, where the objects are individuals and businesses respectively. Practically the same principle is used by business information systems offered by D&B, Hoovers and others. Social networking systems existing on the market today typically apply the concept of relationship to one type of objects—people. Since business is done with people and companies together, Business Information Network's knowledge about the relationships between people, people and companies and between companies brings the level of adequacy and sophistication to a completely different level. The questions like "which company from my prospect list recently employed a CIO that worked for one of my customers over last 3 years" are completely beyond the capabilities of existing systems. Two examples of new level of information that can be used if Business Information Network database is built include Implicit Social Network and Customer Alumni Network as introduced in this invention.

In any market economy, the livelihood of the company depends on its relationships with the outside world, its internal infrastructure, its employees and vital activity parameters, such as cash flow and profit. Short of reading people's minds and perusing through proprietary documents, the Internet provides the best shot at all these factors that describe companies and its place in the economy. Knowing these facts is useful in many areas, e.g. it empowers sales and business development people. The mentioned facts can significantly improve their business and increase effectiveness of the economy at large. As previously discussed, because the companies are interested in promoting themselves, they willingly publish a lot of information, and the Internet made it easier for the publishers and for the receivers of this information. The problem is how to extract the relevant facts from billions of web pages that exist today, and from tens of billions pages that will populate the Internet in the not so distant future.

Thus, there is a clear need for methods and systems, for particular domains, that extract facts from billions of unstructured documents. There is a further need for methods and systems that address the problem of efficient finding and extraction of facts about a particular subject domain from semi-structured and unstructured documents. Yet there is another need for methods and systems that provide efficient finding and extraction of facts about a particular subject domain and make inferences of new facts from the extracted facts and the ways of verification of the facts. There is yet another need for methods and systems that provide efficient find and extraction of facts about a particular subject domain that create an oracle that uses structured fact representation and can become a source of knowledge about the domain to be effectively queried.

SUMMARY

Accordingly, an object of the present invention is to provide methods and systems that extract facts from billions of unstructured documents and build an oracle for various domains.

Another object of the present invention is to provide methods and systems that address the problem of efficient finding and extraction of facts about a particular subject domain from semi-structured and unstructured documents.

A further object of the present invention is to provide methods and systems that can efficiently find and extract facts about a particular subject domain and make inferences of new facts from the extracted facts and the ways of verification of the facts.

Still another object of the present invention is to provide methods and systems that can efficiently find and extract facts about a particular subject domain, which create an oracle that uses structured fact representation and can become a source of knowledge about the domain to be effectively queried.

Still another object of the present invention is to provide methods and systems, which can extract temporal information from unstructured and semi-structured documents.

Still another object of the present invention is to provide methods and systems, which can find and extract dynamically generated documents from so called Deep or Dynamic Web that contains today tens of billion of documents.

DESCRIPTION OF THE FIGURES

FIG. 1 is a block diagram of an embodiment of a system.

FIG. 2 shows the overall system architecture.

FIG. 3 describes the process for finding relevant unstructured and semi-structured documents, extraction of facts from them, verifying them and storing them in the repository.

FIG. 4 describes the process of effective crawling of the web using the concept of crystallization points.

FIG. 5 describes the method of automatic DHTML form detection and crawling of Deep (Dynamic) Web.

FIG. 6 provides a detailed description of false negative rate reduction in crawling by automatic determination of CP crawling parameters.

FIG. 7 provides a detailed description of the process of extracting a page layout from HTML pages.

FIG. 8 describes the process of determining of time reference for facts.

FIG. 9 describes the process of sentence parsing based on the concepts of island grammar.

FIG. 10 provides the description of the multi-pass bootstrapping process to increase precision of the fact extraction.

FIG. 11 describes the process of extraction person-position-company-quote facts from unstructured text.

FIG. 12 describes the process for detection and extraction of Very Important Numbers and corresponding objects.

FIG. 13 describes the process of automatic expansion of grammar rules using iterative training.

FIG. 14 describes the three-layer system of object identification.

FIG. 15 describes the process of recovery from object identification errors.

FIG. 16 illustrates the types of relationships in Business Information Network.

FIG. 17 illustrates the process of generation of Business Information Network.

FIG. 18 illustrates the concept of Implicit Social Network.

FIG. 19 illustrates the concept of Customer Alumni Network.

DETAILED DESCRIPTION

The present invention includes a method and apparatus to find, analyze and convert unstructured and semi-structured information into a structured format to be used as a knowledge repository for different search applications.

FIG. 1 is a high-level block diagram of a system for facts extraction and domain knowledge repository creation from unstructured and semi-structured documents. System 10 includes a set of document acquisition servers (12, 14, 16 and 18) that collect information from the World Wide Web and other sources and using surface and deep web crawling capabilities, and also receive information through direct feeds using for example RSS and ODBC protocols. System 10 also includes a document repository database 20 that stores all collected documents. System 10 also includes a set of knowledge agent servers (32, 34, 36 and 38) that process the document stored in the database 20 and extract candidate facts from these documents. The candidate facts are stored in the candidate database 40. System 10 also includes inference and verification servers (52 and 54) that integrate and verify candidate facts from the database 40 and store the results in the knowledge database 60. The database 60 can be used as a source for data feeds and also can be copied to a database server for an internet application, such as a business information search, job search or travel search.

In one embodiment, the search application is a Business Relationship Network that is a system that finds, analyzes and converts unstructured and semi-structured business information present in the World Wide Web, and provides new generation search capabilities for the internet users.

For a long time, the main thrust in the Information Retrieval field was in building mechanisms to deal with the ever growing amount of available information. With the explosion of the Internet, the problem of scalability became critical. For keyword base search systems, scalability is straightforward. For a system of facts extraction, like Business Information Network, the problem of scalability is significantly more complex. That is, because facts about the same object occur in different documents, and thus should be collected separately but used together to verify or refute each other, and to build a representative description of an object.

In one embodiment of the present invention as illustrated in FIG. 2, a multi-parallel architecture and algorithms are presented for building a linearly scalable system for Information Retrieval that can not only index documents but can extract from them facts about millions of objects.

The architecture of the system 10 is based on the principles of independency of different levels in the system and independency within layers. Thus crawling is done independently from the analysis of the pages. Knowledge agents work independently from each other and within the context of an individual page. Only after candidate facts are extracted they are compared against each other during the inference and verification phase. At that time, the size of the task is several orders of magnitude lower than originally, so it can be handled with limited resources. The algorithms are closely related with these concepts of independent knowledge agents and deferred decisions described hereafter. These principles that are implemented in building Business Information Network are applicable to many other areas, such as job listings, travel information, and legal information.

In one embodiment of the present invention, methods and systems are provided, as illustrated in FIG. 3, that process facts extraction and domain knowledge repository creation. In one embodiment, the methods and systems of the present invention utilize the following steps. Firstly, crawlers crawl the Internet and other sources and generate a set of documents that are analyzed by knowledge agents. Then each document is analyzed by one or more knowledge agents. The analysis consists of two parts—global analysis/layout recognition and local analysis. The results of the analysis are facts that are scrutinized by further steps to eliminate false positives. Then each fact goes through the inference stage where it is getting associated with other facts and existing objects in the repository. After association, the facts are scrutinized against each other to eliminate duplicates and false positives, and finally the facts that passed through previous steps are stored in the repository that becomes a domain oracle.

In one embodiment of the present invention, a method is presented for reduction of the number of false positives in the fact extraction process in Information Retrieval. The mechanisms are based on the principles of deferred decisions and iterative verification. By way of illustration, and without limitation, this method is illustrated using Business Information Network examples, but has general applicability.

The problem of false positives is much more severe for facts-based information system as opposed to search engines. To decrease and eventually eliminate the number of false positives, the decision making process should have several safety mechanisms. The more heterogeneous these mechanisms are, the more reliable the overall system is. The details of building hybrid systems in Information Retrieval are described hereafter. When a hybrid or a multi-oracle system makes a decision, it is more reliable than the decision of a pure homogeneous single-oracle system. But there is another dimension that increases the reliability of a decision—to defer it until new information is available. The deferred decision was used quite successfully, for example, in speech recognition systems. The acoustic cues and the results of phoneme recognition are later used at the linguistic level. The same mechanisms can be applied to the fact extraction in Information Retrieval.

By way of illustration, Business Information Network PPCQ knowledge agent, see below, produces candidate parses while at the database level different parses are checked versus each other and versus established facts in the Business Information Network database to find out which candidates represent a new fact, and which ones indicate a potential contradiction with the existing facts, and therefore should be scrutinized by verification process.

The discrepancy between different candidates for facts and inconsistency between the new and existing facts constitute the area where deferred decisions principle shows its ultimate power.

When these situations occur, the presence of all evidences, parameters extracted by knowledge agents at all stages of the fact extraction process, allows for cross references and elimination of the incorrect candidates. If the existing evidences are not sufficient to resolve the discrepancy or eliminate a candidate with certainty, the following iterative process can be applied to extract additional parameters. Typically when knowledge agents produce a candidate they supply the next layers with just the necessary parameters such as confidence level. In many cases, the output is the best result as opposed to N-best results. Next, layers do not have knowledge or even understanding of specifics and have to rely on this limited number (usually 1) factor. And usually the decision ends up being done based upon this insufficient information. If there is a way to ask the knowledge agent again and, for example, ask for several best results and then combine the original factors that constituted the final score with the factors generated by next layers, the decision becomes much more reliable. Thus deferring the decision, submitting N-best instead of the best answer, and the capability to return back and check the reasons for the choice of the best answer creates a system with low false positives.

Business Information Network utilizes these principles in many cases. PPCQ does not make a decision in the case of embedded parses, but rather submits all of them to the next layers. These layers provide database and dictionary verifications and choose the best candidate. Another example would be for the time stamp Knowledge Agent when the contradiction in bio can require considering all candidates for time stamp in the document, and choose the one that eliminates the contradiction, or if the time stamp ends up being correct to infer potentially false positive fact in the database.

False negatives and false positives are typically perceived as being a part of a zero sum game. You can decrease one, but at the same time the other one will increase. The main reason of that is in the fact that the used mechanisms are homogeneous and non-iterative. In one embodiment of the present invention, a method is presented for a solution of that problem in the Information Retrieval space.

To get out of the predicament of a zero-sum game two principles are utilized: use of heterogeneous Knowledge Agents and Iterative Analysis.

In one embodiment of the present invention, a method is presented for building hybrid systems in Information Retrieval, and their application to a particular field of information retrieval of business information. It also addresses the problems of multi-sense multi-oracle perception by defining two types of mechanisms, statistical and rule-based, of integration of results and mutual influence in the decision making process of different types of oracles/KAs and illustrates these principles on the example of hybrid layout recognition system.

The interrelations between different oracles/knowledge agents in Information Retrieval depend on their nature and their reliability when applied to a particular type of a document. In a case of homogeneous Knowledge Agents, e.g. Link-based and Fact-based ranking, a weighted sum of their results produces much more accurate results, while in a case of heterogeneous Knowledge Agents, e.g. Global and Local Grammar, rule based approach is more productive.

This method of the present invention can include the following: methods for building a hybrid system in Information Retrieval; hybrid relevancy ranking based on integration of the results of independent weight/ranking functions; recursive Knowledge Agents application e.g. Global/Layout Knowledge Agents and Local/Statistical/Grammatical Knowledge Agents.

In one embodiment of the present invention, a method is presented for building a hybrid system that produces a much higher level of reliability with a low false positive rate. The mechanisms are based on the principles similar to ones that are used by humans. They include the incorporation of oracles of different origins (such as global and local grammars), iterative verification process, special garbage model, and deferred decisions. The methods are illustrated on Business Information Network system.

There are two major cases of integration of different oracles: a homogeneous one and a heterogeneous one. The first case is typical for a recognition system with independent ranking mechanisms of hypothesis. Thus in speech recognition several lists of candidate words can be merged together with a linear combination of weights. Known cases demonstrate a 30-50% reduction in error rate using this mechanism. The same approach is applicable to the fact relevancy function and to the document reliability.

Heterogeneous case is quite more complex. The approach used in one embodiment of the present invention is to first specify the "area of expertise" of each oracle and incorporate fuzzy logic (high, medium and low confidence) in decision making. Thus, if an oracle with the right "expertise" has high confidence and all other oracles with the same level of expertise have at least medium confidence, the decision is final. If there is a contradiction between oracles of the highest expertise the fact is escalated to other layers of decision making including potential human interaction.

Layout recognition by humans is an iterative process, where content is used to support visual cues like pictures, horizontal and vertical lines etc. The best results are achieved when both content and layout oracles work in concert with each other to eliminate false page segmentations. This method of the present invention uses this principle to a large extent to approach and demonstrates it on extraction of such important cues like 'about' clause, address, phone number, time stamp, customers and others from HTML pages.

A set of knowledge agents is created that can provide extremely low false positive rate, and is complimentary to each other. Being complimentary, means that the documents that can not be analyzed by one of the knowledge agents can be analyzed by others. The trick is how to produce a set of low false positive knowledge agents that will cover the majority of "relevant" documents. Since each knowledge agent is homogeneous, the process is similar to covering a square with a set of different circles. Since all knowledge agents have a low false positive rate, the overall system has both low positive and low negative rates.

These two principles can be widely implemented in Business Information Network. Thus, knowledge agents are built using combination of different methods, e.g., page layout recognition algorithms use image processing approach, while local grammars are built on the principles of Natural Language Processing, while relevancy oracles are statistically based. Recursive verification is used widely across the board, such as fact extraction done by knowledge agents influence crystallization points being used for crawling.

In one embodiment of the present invention, as illustrated in FIG. 4, a method is provided for efficient crawling of the Internet to find pages relevant to a particular application. The examples of the applications that can strongly benefit from these methods include but are not limited to, business, legal, financial, HR information systems, and the like. The methods can be demonstrated on Business Information Network—Business Intelligence information system. In one embodiment, a set of initial URL's ("crystallization points" or CPs) and the recursive rules of crawling from them are defined as well as the rules of adding new crystallization points to crawl from. Any mechanism of partial crawling can potentially miss relevant pages. The right combination of the parameters for four major steps defined below can be achieved by common sense supported by experiments. But even if the initial set of CPs is relatively small, and the crawling rules are relatively stringent, there is always a way to expand both and also the CP extension provides for that. The only restricting factor is the capacity of the datacenter and the available bandwidth. To decrease the false positive rate special iterative mechanisms are introduced.

For a particular application, such as Business Information Network system, service the Internet can be divided into the following parts: companies/organizations web sites; business publications like magazines, conference proceedings, business newspapers; general purpose newspapers/information agencies; others including personal web sites, blogs, etc.

The first two parts have two advantages, (i) most of the web pages belonging to these sites are relevant to Business Information Network and (ii) they constitute a relatively small percentage of the Internet.

The third source can be extremely relevant or can be completely useless. Fortunately, the sheer volume of the information is significantly smaller than the Internet. That allows for using two approaches, (i) the use of keyword search such as the Wall Street Journal archive, or (ii) the use the same approach as with the companies' websites (described below).

The fourth source constitutes the majority of the Internet and at the same time is less reliable and is less relevant.

Since the introduction of DHTML standard, crawling mechanisms have to deal both with surface web (static) pages and with the deep web (dynamic pages). At the moment the dynamic web is assessed as containing 90% of the information available online.

In one embodiment of the present invention, a method is presented for using crystallization points to build an effective and efficient Web Crawler. FIG. 4 illustrates one embodiment of a method of crawling using crystallization points.

Initial CP's depend on the application, but usually are easy to obtain. For Business Information Network the list consists of the Urls of Fortune 10,000 companies' web sites and 1000 business publications' websites.

A relevant page can be added to the list of CPs if it has the following features, (i) more than four relevant links, or less than four but to or from an "important" page, (ii) it contains a link to a CP, and (iii) the relevance is determined by an independent mechanism, e.g. Knowledge Agents.

A link (Href in html) is called relevant if it or its description contains keywords from a predefined list. In case of Business Information Network, this list can include keywords such as "customer", "vendor", "partner", "press release", "executive", and the like.

Because relevant information is not necessarily defined on the main page, but rather deeper in the site, it is necessary to explore non-relevant links. At the same time the relevant pages are in most cases no deeper than 2-3 levels down from the main page. Thus, there are two major parameters for pruning, (i) forced depth—the maximum distance from a CP without checking relevancy, and (ii) maximum depth—the maximum allowed distance from a CP.

The crawl starts with the initial set of CPs. In one embodiment, the crawl is done breadth first, meaning that all links from a particular page are first explored then each one of them is used as a starting point for the next step. A URL is considered a terminal node of crawling if it does not have "relevant" links and the distance from it to the CPs is equal to the predefined "forced depth" (typically 2 or 3, no more than 4). If a web site has a site map page, which typically has a link from the main page, the forced depth can be just 1.

The crawl stops if one of the following is true, (i) a page is terminal, or (ii) the maximum distance from CPs is reached.

In one embodiment of the present invention as illustrated in FIG. 5, a method is presented for building a deep web crawler. In one embodiment, the process of deep web crawling is separated in four distinct steps, (i) scout, (ii) analyzer, (iii) harvester, and (iv) extractor.

The scout randomly "pings" the forms to collect dynamic pages behind them. The analyzer, with the use of the extractor, determines the underlying structure of queries and generates the instructions for the harvester. The harvester then systematically puts requests to the server and collects all available pages from the server. The extractor extracts unstructured and semi-structured information from the collected pages and converts them into a structured form.

The scout crawling rules are divided into dealing with static and dynamic pages. Since any dynamic web site has static pages also, both types of pages should be crawled over by the scout. The static pages are crawled based on the principles discussed in a description of a generic crystallization point based crawler elsewhere in this patent. As previously mentioned, the main problem with the dynamic pages is that they exist virtually, i.e. they are generated by the server after the question is asked. Dynamic HTML standard provides a special mechanism to ask a question. The mechanism is called forms. Forms are special elements of DHTML that have several types of controls allowing for different ways to ask the question. There are options-based controls (e.g. select and inputradio), where a person chooses one of the options for controls, and there are free form controls (e.g. inputtext and textarea), where any sequence of symbols can be entered. A form can contain any number of controls.

To know what question to ask, the following statistical approach can be used. A number of questions are chosen that covers all possible patterns of dynamic pages produced by this form to allow the following steps, the analyzer and the harvester, to create exhaustive enumerations of questions that will generate all dynamic pages that the server can produce. One needs to realize that some questions can produce a subset of answers of other questions and the answers to different questions often overlap. For example, in many cases the default option means "show all", and using it alone produces all dynamic pages behind the form. In other cases the options provide alternative answers, like if one chooses state in job search. In many applications (e.g. travel search) only option-based controls are used.

To deal with unrestricted text-based controls the following set of questions represents a good strategy: "*", "a*", "b*", "c*" . . . "z*". Randomly chosen, these questions most likely generate a representative set of answers for analyzer and harvester to recon with. Also, a manually created list of questions can be used. This approach works especially well for the applications that have a reasonable number of dynamic pages (within thousands) or have a large number of homogenous dynamic pages like airline ticket search of job boards' sites.

The following table shows an example of the set of rules that can be specified for the scout. The scout applies these rules to a valid form that a current crawled page contains. A separate set of rules define what forms are considered valid, and is described below.

| Run Number | Control Type | Pos KWs | Neg KWs | Input | Number of Trials |
|---|---|---|---|---|---|
| 1 | Select | Job/openings | | | 5 |
| 1 | InputRadio | Location | | | 4 |
| 2 | InputText | Description | | A*\ab*\c\d* | 3 |
| 3 | InputRadio | Month | | | 4 |

The rules for choosing random questions are defined by the table like this. All controls having the same Run Number are mapped to the valid controls in a valid form. The control is valid if its description contains one of the positive keywords and does not contain any of the negative keywords. The map of the rules in the same run to the valid controls generates a bipartite graph. The scout enumerates all possible one-to-one pairs of the rules and controls in the graph. For each map it then generates random choices of options, inputs for text control. Thus for the Run 1 it is 5*4=20 random choices from Select and InputRadio controls, while Run 2 will generate 3 random entries from the list in Input column of the table. This procedure is applied independently to all valid forms on the current HTML page. All HTML pages generated by these questions are stored for the future scrutiny by the analyzer.

The analyzer takes a set of pages created by the scout and builds the set of rules for the harvester. All pages generated by the scout are pushed through the extractor that extracts facts from these pages and stores them in a database. The set of pages extracted by the scout represent a navigation graph that is also stored in the database. Thus, the analyzer starts with the scouting Navigation Graph (SNG) of pages and the set of relevant (to the application at hand) facts extracted from these pages. This graph constitutes a sub-graph of all relevant pages and paths to them that virtually exist. The problem is to convert this graph into a set of navigation rules for the harvester to collect all the relevant pages and build full Navigation Graph of dynamic pages.

The Harvesting Navigation Rule Graph (HNRG) is presented as a set of paths from the roots, which can be main pages of particular sections of companies' web sites, to the relevant pages (e.g. individual job postings). The following procedure is used to build the HNRG from the SNG.

Two relevant pages/nodes in the SNG are called equivalent if they belong to the paths of the same length that contain the same forms and coincide up to the last form. The equivalence class of the relevant nodes constitutes one rule in the HNRG. The rule is described as a path from the root to the form and the number of steps after the last form to get to the relevant nodes. The rule also specifies invalid hyperlinks to avoid excessive crawling without any purpose.

The harvester takes the HNRG and follows one rule at a time. When it hits the form node it applies each combination of options/inputs determined by the HNRG and then proceeds with the static crawling obeying the rules for negative hyperlinks (URLs) and the forced depth of crawl. The results are stored similarly to the results of the scout to be used by the extractor to extract facts.

Any system that can convert unstructured and semi-structured pages can be used as an extractor. For the analyzer stage sometimes even a binary oracle that determines "adequacy" of the page is sufficient, but in many cases the oracle of that kind is almost as difficult to build as a real extractor. The extractor that is used in this embodiment is a hybrid system that uses elements and algorithms described in other parts of this patent. Thus, for a job search application the same steps were used as for the Business Information Network application. Namely, the layout of a page is extracted. That produces the elements containing job title, job description and job location. Then, the time stamp is extracted. Then, the local grammar is applied to determine the title of a job offering, and the detailed structure of job location. This information in combination with the company location being extracted (see Business Information Network) is stored in a Job Database to be used by the end-users to search or by a third party to incorporate into their consumer web site. The same database is used by the analyzer to build the navigation graph for the harvester, but of course the analyzer deals with much smaller set of pages that were produced by the scout.

In one embodiment of the present invention, a method is presented for the reduction of the number of false negatives without going to the other extreme and crawl the entire web. Firstly, the crawling depth and parameters are tuned using training procedures on small samples of the Internet. Secondly, the list of keywords that determines the hyperlinks' relevancy is trained in a similar manner. And thirdly, other statistical methods of determining relevancy such as the number of companies mentioned on the page are applied.

Furthermore, the very structure of the Web with a large number of hyperlinks between individual pages is quite useful to reduce false negatives in crawling. Thus, if a relevant page is too far from certain crystallization points, and is missed in the initial pass of crawling it is quite likely that it is close to the further rounds of CP extensions.

The parameters for CP crawling can be defined manually for some tasks, but for others it is not feasible due to lack of standards and uniformity in the ways how web pages are linked.

A good example of a quite straightforward determination of crawling parameters is a case when one needs to crawl a company's website, (and stay within it), and there is a site map page, the page that contains links to all static pages on the site. Then the depth of crawling of the site is equal to 2, since the site map page is typically connected to the home page, and the crawling of static part of the site is reduced to making one step to the site map page and then to all other pages in one step. If the site does not have a site map or if the crawl is not restricted to one domain at a time, which is typical for Business Information Network, then other means of making CP crawling efficient should be developed.

In one embodiment of the present invention as illustrated in FIG. 6, an algorithm is provided that generates the CP crawling parameters using a random walking from a CP.

The algorithm consists of the following steps. The crawl is organized as a breadth-first search with the depth and valences of urls being balanced such that the overall size of the search graph is limited by a pre-defined number, typically, 1000. Application specific ontology defines a list of "positive" and "negative" keywords. For example for job posting application the words "career", "job", and "employment" would be in the list of "positive" keywords.

The links are divided in two categories—a) ones that contain "positive keywords" and do not contain "negative keywords" in the url itself or in the description of the url, and b) other links that are chosen randomly. The links from the first group are used as soon as the size of the crawl graph is within the limit defined above independently on the distance from the CP. The random links are used only if the distance from the CP does not exceed a predefined number, which can be 4 or 5. Using a semi-random walk a directed graph G of pages is generated. Then the pages from the graph G are submitted to the analyzer that determines their relevancy to the application at hand, see the analyzer in Deep Web Crawling.

The pages that contain relevant information and the path from the CP to them represent a subgraph H of the graph G. Then the histogram of the words that were used in the edges of the graph H is built. The words, excluding auxiliary words like prepositions, and that were used more than in predefined percentage of the cases, which can be 20%, are added to the list of "positive" keywords. The words or sequences of words, excluding auxiliary words like prepositions, that were used in the edges of the graph G\H more than in predefined percentage of the cases, which can be 70%, and are used in edges from the graph H in less than a predefined percentage of the cases, which can be 10%, are added to the list of "negative" keywords. The reason for a much higher threshold is that "negative" keywords can "kill" the right link and should be managed with caution.

The maximum depth of the crawl is defined as the maximum of minimal distances between relevant pages and the root of the graph H—the CP. The forced depth is defined as the maximum number of links of the second type that belong to the shortest paths from the root to the relevant nodes. Since the forced depth parameter controls the percentage of potentially irrelevant pages that can be crawled the following protective measure is used. If the forced depth parameter exceeds a predefined number, which can be 5, than the histogram of the maximum number of links of the second type that belong to the shortest paths from the root to the relevant nodes is built. Then the forced depth is diminished to the number that covers no less than a predefined percentage of links, which can be 80%. Due to the interconnection of pages on the Internet and the presence of other CPs, this percentage can be decreased further to 60% if the forced depth is still bigger than 5. The nodes, pages, from the graph H that do not obey maximum depth and forced depth parameters are excluded. The next steps are similar to the building of the Harvesting Navigation Rule Graph defined above.

In one embodiment of the present invention as illustrated in FIG. 7, a method is presented for automatic high precision/high recall newspaper article (Author, Title, and Body) extraction that does not use templates at all. The articles are assumed to be presented as HTML pages.

The algorithm consists of the following steps. Firstly, an HTML Tree, that includes table depth determination for each node, is built. Then the paragraphs are built and the ones contained href, url reference, are determined. HTML tags and sheer content of a paragraph are used to mark paragraphs that are candidates for authors, titles and dates. E.g. h-tag and title-tag are often used to define a title, b, i, and u-tags are often used to indicate author, while a paragraph containing a time stamp and not much else is a good candidate for the article date, and paragraph consisting of a phrase "written by" and two to five words starting with capital letters is a good candidate for author.

To find the body of an article, the following multi-step procedure is used. Contiguous href and non-href paragraphs are grouped into blocks and are put in three categories by size, small, medium, and large. Small blocks that are not candidates for Author, Title or Date are excluded. Large blocks, which are separated by one href block with less than MAXJUMP paragraphs in it, are merged together. Large blocks of the same table depth, which are separated by no more than MAXJUMP paragraphs. Medium and small blocks with the same table depth, which are separated from the large blocks by no more than MAXJUMP paragraphs, are added to these large blocks. If a large block does not contains less than MINLONGLINE number of long lines it is renamed to medium.

Each remaining large block constitutes a candidate for article body. They then are ordered in descending order by their size. If the number of candidates is 0, the largest medium block that is significantly larger than the second best medium block, is declared a candidate for the body of an article. Body candidates that are adjacent to one another are glued together. The largest body candidate is chosen as article body.

To find a title of an article the following multi-step procedure is used. To recover from the cases of massive attribution of paragraphs as title candidates, if the majority of the paragraphs within body are marked as title candidates of the same kind the title flag of that kind is removed from all of them. Then title flags from paragraphs that are below the initial large block in the body is eliminated. Title flags from paragraphs with "heavy top"—that have at least MAXABOVETITLEPERC of body length above them—are eliminated. If there is a paragraph with title flags that is no further than MAXDEPTH2TITLE from the beginning of the body, then title flags from paragraphs that are more than MINDISTTITLES below it are eliminated. If such a paragraph does not exist, title flags from paragraphs inside the body are eliminated. If there are still candidates for a title inside the body the one with the IRScore, if it is larger than MINIRSCORE4TITLE, is chosen at article title. IRScore is calculated as the Information Retrieval distance between paragraphs and the body.

If there are no candidates inside the body, chose the one with the largest IRScore as the title. If there are still no valid candidates for title, the first paragraph that has IRScore more than MINIRSCORE4TITLE and does not have paragraphs above it longer than MAXCHARINSOFTTITLE, is chosen as article title.

To finalize the results of body, title and author extraction the following multi-step procedure is used. Standard disclaimers like "copyright" paragraphs that contain one of the "prohibited" phrases are eliminated from the body. If the title is extracted, all paragraphs above it from the body are eliminated. The geometrical boundaries of the article are determined to exclude extraneous elements from the article that are positioned close to it on the page, or somewhat intersect with the article. This is done by building a histogram of left and right coordinates of each paragraph in the body and choosing two largest picks in it. The information about the position of an HTML element on a screen is determined by rendering it or by relative calculations based upon width attribute associated with tables in HTML. The paragraphs with the start later than the first ⅓ of the body boundaries or end sooner than the last 10% of the body boundaries are marked as being non-title. The similar procedure is applied to author candidates. That helps significantly to clean up the title and author of the article thus increasing the overall precision of the layout recognition.

The following values were used in one embodiment of this invention: MAXJUMP=12, MINLONGLINE=3, LONGLINE=50, MINIRSCORE4TITLE=3, MINDISTTITLES=5, MAXDEPTH2TITLE=5, MAXCHARINSOFTTITLE=100, MINTITLELENPERC=0.7, MAXABOVETITLEPERC=0.3.

In one embodiment of the present invention as illustrated in FIG. 8, a method is presented to solve the problem of time stamp extraction and verification. This method of the present invention presents algorithms to efficiently detect a potential time stamp, extract it and using the layout recognition results and immediate extended context of a time stamp, and also the presence of other potential time stamp to determine whether a particular document has a time stamp and, if it does, to extract it.

Each html page is parsed and represented as a sequence of paragraphs, each associated with its html tag. There are two algorithms implemented. One deals with the multi-document situation, while the other assumes that there is only one document on a page. Both algorithms use the same mechanism to extract a time stamp from a paragraph. The single document algorithm stops when it extracts a valid time stamp and considers its scope being the entire page. The multi-document algorithm considers each valid time stamp having its scope over the paragraph it was extracted from and the following paragraphs until the next valid time stamp is extracted. Also these two algorithms differentiate in their garbage model. A multi-document algorithm per se does not have the concept of unknown time stamp for the page. Since the paragraphs are looked at in sequential order, if the time stamp is not yet extracted the paragraph in question is declared being with unknown time stamp.

The single document algorithm's garbage model is as follows. As soon as a time stamp is extracted successfully from the current paragraph, the process of time stamp extraction for the current page stops, and extracted time stamp is declared as having the scope over the entire page. That means, for example, that all facts extracted from this page are assigned with the extracted time stamp. If the page time stamp is not yet extracted and the current paragraph is "large", say it has more than 500 characters, the page is declared as being without a time stamp. The second case of declaring a page being without a time stamp is if there is confusion in time stamp extraction in current paragraph.

To extract a time stamp from a paragraph the following multi-step procedure is used. Each word, not including separators, is looked at as a potential candidate for Year, Month, or Day of a time stamp. The candidate is called strong if it is a candidate for only one out of the three parts of a date (Y, M, D). Then for each candidate word for Month the surrounded candidates for Year and Day are checked on whether they constitute a triad. Triad is a set of three sequential words in paragraph. The following four (out of potential six) triads are allowed—(Y, M, D), (Y, D, M), (M, D, Y) and (0, M, Y). Quite often the current date is posted on a web page for users' convenience. It can be confused for the time stamp of a document published on this page. To avoid that, the triad that is equal to the current date or a day before is discarded. For each triad the check is performed on the consistency of the separators dividing the words in the triad as well as the words surrounding the triad being consistent with the time stamp representation. The following separators between the words in a triad are allowed: '/' '/', '–', '–', ',' ',', ',' ',', ',' ',', ',' ',', ',' ',', ',' ',', ',' ',', ',' ',', ',' ',', ',' ',', ',' ',', ',' ',', ',' ',', ',' ',', ',' ',', ',' ','.

If there is more than one valid triad in a paragraph and they do not share the same words or words immediately to the left or to the right of a valid triad are numbers or potential candidates for Year, Month or Day, then the time stamp is declared as unknown.

In one embodiment of the present invention as illustrated in FIG. 9, a method is presented for efficient grammatical parsing based upon island grammar and linear parsing approaches. The results of parsing are represented as a sequence of intervals of words in a sentence (not necessarily including all words in the parsed sentence) marked by the tags defined in the grammar. These tags are later used to determine relevance of the sentence to the application and potential intra-sentence references. E.g. anaphora/cataphora resolution and their special case of pronoun resolution, such as in the case when an object such as company or person is named not directly but by a pronoun (he, she, it). In the latter case the noun phrase analyzer is used to determine the matching between the pronoun and the tagged word interval.

The procedure of grammatical analysis of each paragraph is defined by the following steps. Firstly, context grammar is applied. Context grammar determines the scope of each context on a page. Then a particular local grammar rule is applied only to the paragraphs that belong to the scope of context rules that are related to this local grammar rule. If the paragraph belongs to the scope of a context grammar rule then all the Local Grammar rules are applied to it. The results of the parsing using these rules are considered mapping candidates. Each candidate then is checked by applying verification functions. The survived mappings are stored as candidate facts for future analysis by higher level of the system 10.

The applicability of local grammar rules is determined by a separate layer—so called Context Grammar The current embodiment of context grammar is built as a set of rules each of which has the following structure: (LastHeaderHTMLTag, LastHeaderKWs, Po sitivePrevHeaderHTMLTag, Po sitive-PrevHeaderKWs, NegativePrevHeaderHTMLTag, Negative-PrevHeaderKWs, Local Grammar Rule Type). In some cases, local grammar does not need to be applied, which is the case, for example, if a table is analyzed. Examples of such rules are as follows:

(h1\h2\h3\h4\h5\h6\h7\h8\h9\head\strong\b\form\, description\requirement\responsibiliti\qualifications\ education\functions\job summary\, , , ,), where local grammar is not applied; or (title\h1\, , , , KA_LocCity) which defines all paragraphs that are within <title> or <h1> tags scope should be parsed with the local grammar rules of type KA_LocCity.

Island grammar is described using a special language that allows specifying the structure of the sentence in terms of intervals and separators. The current embodiment of local grammar is built as a set of rules, each of which has the following structure:
(Separator0, Object1_Type, Object1_Role, Separator1, Object2_Type, Object2_Role, Separator3 . . . ). An example of such a rule is as follows: ("said", PersonName, Employee, ",", PositionName, "of", CompanyName, Employer, ".").

A separator can be any sequence of symbols, while roles can be specific (like "employee", "vendor" etc.) or irrelevant (called "junk"). Another example is related to the context grammar rule described in the previous discussion: (city\town\, EMPTY, empty, \, LOCCITY, loccity).

For every grammar rule the following procedure takes place. Using Knuth-Morris-Pratt algorithm of string matching, the set of all matches of all words used in the rule to the sentence to be parsed, is calculated. After that the table of right most possible match of each word in the rule to the sentence to parse is built. Using this table the list of all possible parses is built using backward mapping. This algorithm has a complexity of O(nm), where n is the number of words in the sentence to be parsed, and m is the length of the rule. Since no rule can not be of length more than a predefined constant, say 10, overall upper bound for this parsing procedure is linear—O(n).

For a triplet (Object, ObjectRole, RuleType) a set of verification procedures can be assigned. A procedure can be functional, e.g. "check that all non-auxiliary words in the word interval start with capital letters", or check that the word interval belongs to a particular list of collocations. For each new mapping, all applicable procedures are executed and, if one check fails the mapping is rendered incorrect. At this moment parser backtracks and generates the next partial mapping. If all checks are passed the parser adds next element into mapping and verification process starts again. Full mappings are stored to be supplied for next levels of verification such as cross reference or semantic analysis.

In one embodiment of the present invention as illustrated in FIG. 10, a method is presented for object, relationships and attributes identification by providing mechanisms to iteratively verify the validity of a candidate for a new object, relationship or attribute. This method of the present invention defines recursive mechanisms that verify the objects, relationships or attributes extracted by one knowledge agent by finding a match with the objects, relationships or attributes appeared in the results of the analysis of other knowledge agents. A rigorous use of these methods can virtually eliminate false positives. The algorithms are illustrated in determination of employee position and company name in Business Information Network.

To determine the validity of a potential object iterative bootstrapping procedure is used.

One embodiment of iterative bootstrapping that can be utilized with the present invention is discussed hereafter. The same mechanism can be used in different areas of object, relationship or attribute extraction within or outside Information Retrieval.

By way of illustration, and without limitation, consider the mentioned above local grammatical rule: ("said", Person-Name, Employee, ",", PositionName, "or", CompanyName, Employer, "."). If it is applied to a particular sentence and the result of parsing is such that PositionName="Vice President of Operations" is already in the Business Information Network, then the CompanyName of a particular parse is considered as a candidate for being included in Business Information Network. But to be considered for the verification step, this CompanyName should appear in a parse from a rule of different type that, say, puts different restrictions on the sequence of words to be a CompanyName. This process can be repeated several times to increase the assurance that this particular CompanyName is a valid one. And of course if this particular CompanyName appeared in many more parses of different documents, it increases the probability of it being valid. And, as usual, the set of dictionaries can be used to further verify the validity. The problem with dictionaries is that one needs to find the way to automatically build them starting with the core built which can be manually. Dictionary of PositionNames is a good starting point due to the relatively small size of it—thousands of entries vs., say, millions of entries in the Dictionary of CompanyName's. The mentioned above mechanism provides for that process. As soon as the dictionaries are large enough it is used quite aggressively to verify parses.

Business Information Network dictionaries include the dictionary of Position Names, Companies Names, Names of Individuals, and the dictionary of Synonyms, e.g. IBM—International Business Machine, Dick-Richard etc. These dictionaries grow along with the growth of Business Information Network. Of course, people names and their synonyms/short versions are known pretty much in advance, as well as the official names of large companies, and a basic list of positions (e.g. President, CEO, Vice President of Marketing etc.). The bootstrapping process described above allow these dictionaries to grow based upon successful parses with strict rules on potential validity of a particular sequence of words to be a position or a company name; also manual verification is used when a low confidence value comes from the validity rules checker. This procedure does not guarantee 100% correctness of the dictionary entries, but is comes quite close to that. The random manual checks should be performed to lower false positive rate.

In one embodiment of the present invention as illustrated in FIG. 11, a method is presented for extraction of PPCQ—Person, Position, Company, Quote—facts from individual news articles, press releases etc. A classic example of PPCQ is—John Smith, VP of Marketing at XYZ said "...". The list of potential companies being mentioned in the article can either be furnished explicitly or can be implicitly presumed as being from a known list of companies.

The PPCQ extraction algorithm can use the local grammar mechanisms described elsewhere in this specification. These mechanisms extract the list of candidate PPCQ vectors V=(person name, position, entity name, quote), which constitutes the initial set S of the PPCQ extraction algorithm.

Often there is no one sentence that contains the full PPCQ. One sentence can have PPC but no Q, another one has just person's first name and quote (John said "...") or even a pronoun and a quote (she added "...").

After the set S is built, the vectors related to the "same" person and the "same" entity are merged, while "orphan" incomplete vectors and vectors with unclear attribution are excluded. This process is basically a mapping between instances of the person-object and entity-object and the corresponding objects. The names PINS and CINS are used for person and company instances (mentions) and PDEN and CDEN for corresponding objects.

As illustrated in FIG. 11, the PPCQ extraction algorithm consists of the following steps. Firstly, using the "C" part of PPCQ vectors from S the CINS set is built. Then by matching CINSs to the predefined explicit or implicit list of companies the CDEN set is built. If a CINS belongs to several CDENs, it is excluded from further considerations. Then using the first "P" part of PPCQ vectors from S the PINS set is built. Similarly to CDEN, the PDEN set is built and PINSs that belong to more than one PDEN are excluded. Then incomplete PPCQ vectors are merged to create four full components PPCQ vectors using direct component match and pronoun resolution. Then for each PDEN maximum by inclusion position is chosen. And finally all incomplete PPCQ vectors that were not embedded into full vectors are eliminated.

In one embodiment of the present invention as illustrated in FIG. 12, a method is presented for extraction of VINs (Very Important Numbers) and associated objects in unstructured and semi-structured documents.

The process of VINs extraction consists of the following steps. Firstly, the areas in the documents, where the numbers are mentioned are determined. Then these numbers are extracted, and finally the objects that these numbers are referring to are determined.

The areas containing VINs are defined by using layout format as well as the grammatical structure. The layout information is used to detect the potential VINs inside of a table or as a potential attribute of a page (e.g. copyright sign with dates at the bottom of a page) while a sentence and paragraph syntactic structure is used in other cases.

VINs are described in several formats. A common one is the sequence of digits sometimes divided by comma. Also numbers can be spelled (like twenty four instead of 24). The scale (%,$ etc.) is determined by the analysis of the immediate surrounding.

To determine which object a particular VIN is referred to the following methods. If the VIN containing area is sentence, NLP parsing is applied to determine the noun phrase corresponding to VIN. If the VIN containing area has a structured format, such as list or table, the title of the list or the corresponding column/row is used to determine the object. Thus for Business Information Network in the case of SEC filings gross revenues are extracted from the tables, the row title is used to determine a particular line item in the financials while the column title is used to determine the time interval such as quarter or year. At the same to determine the number of employees from the SEC filings the NLP parsing is used.

In one embodiment of the present invention as illustrated in FIG. 13, the bootstrapping process for building grammar rules for a particular vertical domain (Business Information Network, Travel, etc.) starts with a manual set of rules built by a knowledge engineer by observing different types of documents and different ways of facts presentation. This zero iteration of rules is used by a fact extraction system to generate a set of candidate facts, as described with regard island grammar herein.

The entities extracted from the zero iteration can be used to generate first level of iteration for a set of grammar rules using the following process. The set separators used in each existing rule is enlarged by adding all "similar" words/collocations. Thus, if the pronoun "he" is in the set, than the pronoun "she" is added to the same separator. The same process is applied to different tenses of the verbs (e.g. the verb "said" generates "says" and "say"), particles (e.g. "on" generates "off", "in" etc.). And finally all synonyms of the existing separators are added too.

Then the expanded grammar is applied to a large number of representative pages (e.g. if one press release was parsed by the existing grammar, add all press releases from the same company, or from the entire service like Business Wire) to extract facts. Separators that did not participate in the extracted facts are deleted from the grammar, unless they were present at the zero iteration. They also are deleted if they produced a lot of erroneous results.

Then a set of new pages is presented for the fact extraction using the new version of separators. New objects and attributes, e.g. Position, CompanyName, PersonName, which participated in the extracted facts are added to the object dictionaries.

The second, third, and so on iterations can be done in the same way. The number of iterations depends on the quality of the initial set of rules and the size of the training set of documents. The process can stop, for example, after 10 or so iterations due to stabilization of the grammar or when it reaches a pre-defined maximum number of iterations.

Due to the high efficiency (O(n)) of the parsing mechanism even words/separators from the set of rules that were used rarely or even were not used at all in the training set are kept in the grammar. This approach makes the set of rules quite stable and minimizes the maintenance problem. It also helps to deal with unseen before fact description habits.

In one embodiment of the present invention as illustrated in FIG. 14, a method is presented for object identification and inference. The approach is based on three-layer representation of an object (Instance, Denotatum, Denotatum Class), the roll forward mechanism to delete incorrect equivalences without destroying correct ones. Also the methods of inference based on morphological, grammatical and layout proximity between instances of the objects and their unique attributes are presented.

By way of illustration, and without limitation, Business Information Network deals with the Instance-Denotatum problem for each object, company and person. In this embodiment, Business Information Network has three levels of representation. The first level is an "instance" level. Corresponding types are CINS and PINS for instances of companies and persons. Each sequence of words in a document that can be a name of an object, e.g. CINS, is stored as an instance of an object, which is called its denotatum, CDEN. Each document is presumed not having equivalent CINS's belonging to different CDEN's. For example, one can not use in one document the same name for two different companies without creating confusion. The problem becomes more complicated when one goes beyond individual document. The equivalence of two different CDEN's can be determined using different heuristics similar to the one just described. But the very nature of dynamic Business Information Network facts extraction process demands that the equivalence can be determined and reevaluated. That's why Business Information Network contains the third level, so-called DENClass that provide necessary means for denotata equivalence.

In one embodiment, the inference rules are divided into domain dependent and domain-independent. An example of domain-dependent rule is the rule that a person can be a member of several Boards of Directors but can not be a vice president of two different companies at the same time. This rule is not absolute, so if there are many facts about a particular person that say otherwise this rule can be suppressed. The suppression usually happens if there is no temporal information available, since in most cases these positions were held not simultaneously. Using the time stamp extraction mechanism of the present invention can resolve issues like this in many cases. Time stamps also help in building person's bio from disparate facts collected from different sources. Another way to resolve the potential contradiction is determination of verb tense being used to describe the fact. Thus, in press releases often the phrases like "before joining our company, John Smith was a director of marketing communications at Cisco" are quite useful not only to build a bio, but also to distinguish this John Smith from another one with the same name who did not work at Cisco before joining this company. Absolute or relative temporal information like this constitutes a domain-independent inference rule.

New facts can be added to the fact database constantly. These facts can bring new information, can be a change of the existing facts including their invalidation, e.g. retraction of a publication, and can also be in contradiction with the existing facts. Besides the facts are coming in no particular order due to parallel search and multiple sources that generate the facts. To deal with the problem of potential errors and contradictions in entities extraction and equivalence determination, one embodiment of the present invention as illustrated in FIG. 15, applies a non-traditional transactional model called "Roll Forward". If a contradiction or error in equivalence is determined, which can happen due to a human reporting an error or due to contradictive facts collected automatically, the "suspicious" area is "disassembled" and "reassembled" again. A typical example is incorrect "merging" of two persons with the same name into one person. If that error is detected the entire PDENClass is destroyed, and two new PDENClasses are built from scratch using all PDENs that belonged to the destroyed PDENClass. This mechanism is especially effective when the concept of candidate facts is propagated through the architecture of the system. The decision if two instances of the "John Smith" represent the same person or not is made in the following two ways. One way is to use a system default in determining the correspondence between INS, DEN and DENClass, while another one is to provide a user with the parameters to determine the scope of sources and the threshold of the "merging" decision. Thus, if the user has a preference of the sources that contain "correct" facts, the number of potential "merging" errors can be reduced significantly. Also parameters like time stamp, position, company name, school name, can be used to make the "merging" decision.

In one embodiment of the present invention as illustrated in FIG. 16, a Business Information Network is defined as a hyper graph consisting of two types of major objects, companies and individuals. Each object has its own list of attributes and objects are connected with each other by different relationships, e.g. employee-employer, company-subsidiary, vendor-customer, seller-buyer, etc.

The system 10 of the present invention can provide a new way to look at the economy in general as well as at a particular industry or market segment. Knowing the relationships between companies one can obtain answers to questions about market segment activity, trends, acceptance of new technology, and so on and so forth. The system 10 can be utilized in a variety of different uses, including but not limited to, provide on-line service to sales people to help them better assess prospects and find right people in prospects to approach for potential sale, use as venture capital investment strategy based on the knowledge of the small companies' activities and buying patterns of large companies, in merger and acquisition activity where the system 10 facilitates the process of finding a buyer for a company or a target for acquisition, and the like.

In one embodiment as illustrated in FIG. 17, the process of generating a Business Information Network database can consist of the following steps. Firstly, the documents from different sources are collected. The sources include Public Internet Companies/Organizations web sites, Press Releases, Magazines/Journals Publications, Conferences Presentations, Professional Memberships Publications, Alumni News, Blogs etc.; Government Sources—SEC Filings, USPTO, Companies Registration, etc.; Proprietary Sources (to be used only by the users that provided them or authorized to by the owner)—Magazines/Journal Publications, Purchased Databases, Analyst Reports, Purchased Trade Shows Attendance Lists, etc.; Personal Rolodexes (to be used only by a person who provided it); Companies' intranets and databases (to be used only by the people authorized by the information owner). Then knowledge agents are applied to documents to extract business related information to be stored in Business Information Network Database. After that incorrect or irrelevant facts are filtered out using different fact verification techniques. Then different consistency checks are applied to solidify the correctness of facts. The facts that went through these checks are stored in Business Information Network database. Then the information in the database is made available to on-line users. The collection process constitutes permanent activity, since the information grows every day, and changes every day.

In one embodiment of the present invention, a business information system is provided that extracts facts deals with the issue of efficient presentation of these facts in a structured form. The objects, their relationships and their attributes should be stored in a way to make the process of answering questions straightforward and efficient. To be able to do that the data representation should reflect potential questions. At the same time the data representation should be relevant to the mechanisms for facts extraction, since they Ultimately decide what information is stored in the repository. In one embodiment of the present invention, a method is presented for designing of templates that covers majority of business questions, and building database structure that supports these templates and at the same time matches the capability of the facts extraction mechanisms described in related sections. Business Information Network frameworks can include the following elements: objects companies, individuals; relations: subsidiary, acquisition, employee, employer, friend, vendor partner, customer, schoolmate, colleague; auxiliary elements: —paragraphs, documents, web pages; attributes—position, quote, earnings, address, phone number; instances and denotate.

There are two major objects in Business Information Network—company and individual. Company object represents businesses, non-profit organization, government entities and any other entities that participate in one way or another in economic activity. Individual/Person object represents any person participating in economic activity, such as employee, owner, government official etc.

Objects can participate in relationships. Each relationship has two objects that are a part of it. Different relationships extracted from the same document are useful to establish multi-link relations. For example, a quote in a press release can establish that a person works at a company that is a vendor of another company. Auxiliary elements include web pages, documents (can be several in one page) and paragraphs (can be several in one document).

Each object, relationship or auxiliary element can have attributes. Attributes can be static, e.g. time stamp, URL, and dynamic, e.g. position, quote.

As an illustration consider the following example. A press release that contains the following information: "Company C purchased a Product P from Company V. The Product P is installed in X number of locations. Person V, VP Sales of Company V is "delighted to have Company C as a customer of their new line of products" and Person C, CIO of Company C is "considering Product P the first step in their 3 year project to revamp the entire IT infrastructure of Company C" will yield the following relationships:

| Relationship Type | Object Types | Objects | Attributes |
|---|---|---|---|
| Employer - Employee | CINS-PINS | Company C - Person C | Position: CIO Quote: "" |
| Employer - Employee | CINS-PINS | Company V - Person V | Position: VP Sales Quote: "" |
| Customer - Vendor | CINS-CINS | Company C - Company V | Product: P VIN: X number of locations Quotes |
| Customer - Seller | CINS-PINS | Company C - Person V | Quote |
| Vendor - Purchaser | CINS-PINS | Company V - Person C | Quote |

In one embodiment of the present invention the list of attributes includes the following: company—name, address/phone/url, about, quarterly/early sales, number of employees; offering—name, description; person—name, age; relationships employee-employer—position, time stamp; vendor-customer—quote, time stamp; company-acquirer—quote, time stamp; member-association—quote, time stamp.

In one embodiment of the present invention as illustrated in FIG. 18, a concept of Implicit Social Network is introduced and a method is presented for building it by analyzing unstructured documents, and/or directly using Business Information Network.

To address the problems of explicit rolodex described above, one embodiment of the present invention is an Implicit Social Network. Two people are connected implicitly if they have some of the following things in common: they worked on the same board for some time interval; they were members of the same management team for some time interval; they graduated the same year from the same graduate school; they were buyers and sellers, correspondingly, in the same transaction. There are many other cases when two people know each other, but not necessarily keep the name of another person in their corresponding rolodexes.

Each particular type of relations can be more or less strong and more or less relevant to a task of a person trying using Implicit Social Network. The Implicit Social Network exists side by side with Explicit Rolodex and quite often overlaps it. The advantages of Implicit Social Network come from the fact that it is built using public sources—Internet first and foremost. As a result, it is completely transparent, it potentially can include tens of millions of people, it updates on a daily basis.

Implicit Social Network is represented as a graph of individuals with edges colored by the type of connection and weighed by the number of factors defining the type of connection. For example, with the work on the same management team the duration is an important factor. Also if two people worked together as members of management team in several different companies the weight of the edge is much higher than if they worked together for few months just once.

Implicit Social Network is a subgraph of Business Information Network graph that consists of individual-individual relationships with attributes defining the details of the relationships between two individuals and weight function defining the strength of the relationship. The strength and importance of the relationship incorporates objective (e.g. time spent working together) and user-defined parameters (e.g. only work in telecommunication industry is relevant).

The world of business relations can be described as a temporal colored graph G with two types of vertices—people and companies. The colors of edges between people vertices represent social networking relationships. The colors of edges between companies represent relationships like partners, vendors, customers, etc. The colors of edges between people and companies represent relationships like employee, consultant, customer, etc. Temporal portion of this graph is represented by a pair of time stamps (from, to) associated with each vertex and each edge. A number of questions about business can be expressed in terms of this graph and answered by a system (like Business Information Network) that has this graph populated. These questions are covered by Customer Alumni Network.

As illustrated in FIG. 19, a Customer Alumni Network for a particular company, called nucleus, is a set of people that worked for this company's customers in specified position in a specified time interval plus the companies they work for now. Without using this particular term, sales people were looking for capitalizing on their marquee accounts to acquire new customers using people that had first hand experience with their product and can be champions if not decision makers in their new jobs. Customer Alumni Network is built directly from Business Information Network starting with nucleus and going through its customers, then buyers and employees in these customers and into their new employments after they left these customers of nucleus.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for reducing a number of false positives in a fact extraction process, comprising:
   utilizing a deferred decision method;
   building several levels of verification steps to eliminate incorrect candidate facts;
   applying a set of knowledge agents of different type to verify results of each other;
   utilizing N-best results to support a deferred decision method; and
   accommodating a detailed rerun of appropriate knowledge agents to retrieve additional parameters to resolve fact discrepancies.

2. A method for extraction of very important numbers and objects that are associated with from a page comprising:
   determining paragraphs and tables containing numbers; and extracting the numbers.

3. The method of claim 2, wherein immediate context of each extracted number comprising of a paragraph or a table is determined.

4. The method of claim 3, wherein classic part of speech tagging is applied to determine the object corresponding to the number, if the context is a paragraph.

5. The method of claim 4, wherein the table column titles are used to determine the column describing the object corresponding to the column containing the number, if the context is a table.

6. The method of claim 5, wherein the value of the cell in the determined object column and in the number's row is chosen as the object corresponding to the number.

7. The method of claim 5, wherein rows are used instead of columns to determine the object position.

* * * * *